US011651034B2

(12) United States Patent
Bagley, Jr.

(10) Patent No.: US 11,651,034 B2
(45) Date of Patent: *May 16, 2023

(54) METHOD, SYSTEM, AND COMPUTER PROGRAM PRODUCT FOR COMMUNICATION WITH AN INTELLIGENT INDUSTRIAL ASSISTANT AND INDUSTRIAL MACHINE

(71) Applicant: iT SpeeX LLC, Wilmington, DE (US)

(72) Inventor: Ronald D. Bagley, Jr., Hidden Valley, PA (US)

(73) Assignee: iT SpeeX LLC, Wilmington, DE (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/376,365

(22) Filed: Jul. 15, 2021

(65) Prior Publication Data

US 2021/0342401 A1 Nov. 4, 2021

Related U.S. Application Data

(63) Continuation of application No. 16/512,941, filed on Jul. 16, 2019, now Pat. No. 11,074,297.

(60) Provisional application No. 62/699,394, filed on Jul. 17, 2018.

(51) Int. Cl.
*G05B 19/418* (2006.01)
*G06F 16/9032* (2019.01)

(52) U.S. Cl.
CPC . *G06F 16/90332* (2019.01); *G05B 19/41815* (2013.01); *G05B 19/41865* (2013.01)

(58) Field of Classification Search
CPC .... G06F 16/90332; G06F 9/451; G06F 3/167; G05B 19/41815; G05B 19/41865; Y02P 90/80
See application file for complete search history.

(56) References Cited

U.S. PATENT DOCUMENTS

| 4,462,080 A | 7/1984 | Johnstone et al. |
| 6,477,437 B1 | 11/2002 | Hirota |
| 6,757,362 B1 | 6/2004 | Cooper et al. |
| 6,895,380 B2 | 5/2005 | Sepe, Jr. |
| 6,907,317 B2 | 6/2005 | Peshkin et al. |
| 6,912,428 B2 | 6/2005 | Nakai et al. |
| 6,928,336 B2 | 8/2005 | Peshkin et al. |

(Continued)

FOREIGN PATENT DOCUMENTS

| CN | 100470420 C | 3/2009 |
| CN | 102999322 A | 3/2013 |

(Continued)

*Primary Examiner* — Darrin D Dunn
(74) *Attorney, Agent, or Firm* — The Webb Law Firm

(57) ABSTRACT

Provided is a method for communication with an intelligent industrial assistant and industrial machine. The method may include receiving a first natural language input from a user. The first natural language input may be associated with a first command for an industrial machine to perform a first process. The industrial machine may be instructed to perform the first process based on the first natural language input. A second natural language input may be received from the user while the industrial machine is performing the first process. A first response may be determined based on the second natural language input. Communication of the first response to the user may be initiated while the industrial machine is performing the first process. A system and computer program product are also disclosed.

20 Claims, 8 Drawing Sheets

(56) References Cited

U.S. PATENT DOCUMENTS

| | | |
|---|---|---|
| 7,120,508 B2 | 10/2006 | Peshkin et al. |
| 7,245,990 B2 | 7/2007 | Watanabe et al. |
| 7,920,678 B2 | 4/2011 | Cooper et al. |
| 8,000,453 B2 | 8/2011 | Cooper et al. |
| 8,196,155 B2 | 6/2012 | Huang et al. |
| 8,751,717 B2 | 6/2014 | Miyake |
| 9,082,239 B2 | 7/2015 | Ricci |
| 9,826,599 B2 | 11/2017 | Banta |
| 9,830,044 B2 | 11/2017 | Brown et al. |
| 9,966,065 B2 | 5/2018 | Gruber et al. |
| 2004/0034532 A1 | 2/2004 | Mukhopadhyay et al. |
| 2005/0005266 A1 | 1/2005 | Datig |
| 2006/0149824 A1 | 7/2006 | Park et al. |
| 2007/0143127 A1 | 6/2007 | Dodd et al. |
| 2009/0228122 A1 | 9/2009 | Baier et al. |
| 2013/0030750 A1 | 1/2013 | Kim et al. |
| 2013/0031287 A1 | 1/2013 | Miyake |
| 2013/0218574 A1 | 8/2013 | Falcon et al. |
| 2013/0317816 A1 | 11/2013 | Potter |
| 2015/0121216 A1 | 4/2015 | Brown et al. |
| 2015/0206534 A1 | 7/2015 | Shinkai |
| 2016/0343372 A1 | 11/2016 | Motomura et al. |
| 2017/0038763 A1 | 2/2017 | Brown et al. |
| 2017/0068550 A1 | 3/2017 | Zeitlin |
| 2017/0278000 A1 | 9/2017 | Kohlhepp |
| 2019/0147872 A1 | 5/2019 | Sasaki |
| 2019/0206400 A1 | 7/2019 | Cui et al. |
| 2019/0389075 A1 | 12/2019 | Hashimoto et al. |

FOREIGN PATENT DOCUMENTS

| | | |
|---|---|---|
| CN | 105931218 A | 9/2016 |
| EP | 1973072 A1 | 9/2008 |
| EP | 2140370 A1 | 1/2010 |
| EP | 3173983 A1 | 5/2017 |
| EP | 3185094 A1 | 6/2017 |
| EP | 3244301 A1 | 11/2017 |
| TW | I622474 B | 5/2018 |
| WO | 0109724 A1 | 2/2001 |
| WO | 0156016 A1 | 8/2001 |
| WO | 2007052285 A2 | 5/2007 |
| WO | 2011163062 A2 | 12/2011 |
| WO | 2014197126 A1 | 12/2014 |

METHOD, SYSTEM, AND COMPUTER PROGRAM PRODUCT FOR COMMUNICATION WITH AN INTELLIGENT INDUSTRIAL ASSISTANT AND INDUSTRIAL MACHINE

CROSS-REFERENCE TO RELATED APPLICATIONS

This application is a continuation of U.S. patent application Ser. No. 16/512,941, filed Jul. 16, 2019, which claims the benefit and priority of U.S. Provisional Application No. 62/699,394, filed Jul. 17, 2018, the disclosures of which are hereby incorporated by reference in their entireties.

BACKGROUND

1. Field

This disclosed subject matter relates generally to methods, systems, and products for an intelligent assistant and, in some particular embodiments, to a method, system, and computer program product for communication with an intelligent industrial assistant and industrial machine.

2. Technical Considerations

Certain machines may be usable (e.g., controllable and/or the like) via a physical interface (e.g., keyboard, keypad, and/or the like) integrated with the machine. Such interfaces may vary based on the type of machine, e.g., based on the manufacturer, third party controller/interface provider, model, and/or the like associated with such machine. Such interfaces allow inputting a command or code (e.g., numerical code and/or the like) to initiate a process/function of the machine. Some such interfaces may directly control such process/function while it is executing.

However, such interfaces may not allow a user to enter other commands or codes while such a process/function is executing. For example, while the controller of the interface is occupied controlling such process/function, such controller may be incapable of separately receiving additional commands or codes.

Additionally, users of certain machines (e.g., operators of industrial machines and/or the like) may be trained to use such machines. For example, each machine may be usable (e.g., controllable and/or the like) via a physical interface (e.g., keyboard, keypad, and/or the like) integrated with the machine. Such interfaces may vary based on the type of machine, e.g., based on the manufacturer, third party controller/interface provider, model, and/or the like associated with such machine.

However, training to use such interfaces may be time consuming. Additionally, manual efforts (e.g., multiple key strokes, clicks, and/or the like), time, and/or the like may be required to use (e.g., control and/or the like) such machines via such interfaces. Moreover, a user (e.g., machine operator and/or the like) may not be able to control other machines (e.g., separate industrial machine on a factory floor, newly acquired industrial machine, upgraded industrial machine, and/or the like) without separately learning (e.g., being trained on and/or the like) the interfaces of such other machines. Even if a user did know how to use multiple machines, it may require manual efforts and time to move between machines, and/or such a user may not be able to monitor multiple separate machines simultaneously. Further, if a user's hands are occupied (e.g., carrying an object, writing notes, assisting another individual on the factory floor, and/or the like), such a user may not be able to suitably manipulate the interface of the machine. In addition, if such an interface includes only visual indications of status or other information (e.g., display screen, indicator lights, and/or the like), a user may not be able to adequately be able to receive such indications of status or other information while looking elsewhere (e.g., looking at anything else that may be anywhere else on a factory floor).

SUMMARY

Accordingly, it is an object of the presently disclosed subject matter to provide methods, systems, and computer program products for communication with an intelligent industrial assistant and industrial machine.

According to non-limiting embodiments, provided is a method for communication with an intelligent industrial assistant and industrial machine. In some non-limiting embodiments, a method for communication with an intelligent industrial assistant and industrial machine may include receiving, by an intelligent industrial assistant, a first natural language input from a user. The first natural language input may be associated with a first command for an industrial machine to perform a first process. The intelligent industrial assistant may instruct the industrial machine to perform the first process based on the first natural language input. The intelligent industrial assistant may receive a second natural language input from the user while the industrial machine is performing the first process. The intelligent industrial assistant may determine a first response based on the second natural language input. The intelligent industrial assistant may initiate communication of the first response to the user while the industrial machine is performing the first process.

In some non-limiting embodiments, the first response may be based on a first context. Additionally or alternatively, the first context may be based on at least one of the first process running on the industrial machine, one or more processes of a work cell that includes the industrial machine, a type of the industrial machine, a role of the user, any combination thereof, and/or the like.

In some non-limiting embodiments, the intelligent industrial assistant may receive event data associated with a first event from the industrial machine. Additionally or alternatively, the intelligent industrial assistant may interrupt the communication of the response to the user.

In some non-limiting embodiments, before interrupting the communication of the response, the intelligent industrial assistant may determine whether to interrupt the communication of the first response based on the event data.

In some non-limiting embodiments, the intelligent industrial assistant may determine a second response based on the event data. Additionally or alternatively, the intelligent industrial assistant may initiate communication of the second response to the user.

In some non-limiting embodiments, upon completion of the communication of the second response to the user, the intelligent industrial assistant may continue communication of the first response to the user.

In some non-limiting embodiments, the second natural language input may be associated with at least one of a query of a database connected to the intelligent industrial assistant, a query regarding a status of the industrial machine, a query regarding a status of the first process, a request to set up a second process of the industrial machine, a request to generate a report associated with the industrial machine, a request to perform a third process by a second industrial machine, a request to coach the user how to perform a fourth process, a request to teach the user a new skill, any combination thereof, and/or the like.

In some non-limiting embodiments, the first response may include at least one of coaching the user how to perform a second process, teaching the user a new skill, any combination thereof, and/or the like.

In some non-limiting embodiments, the event may include an alarm of the industrial machine. Additionally or alternatively, the intelligent industrial assistant may instruct the industrial machine to stop the first process based on the alarm.

According to non-limiting embodiments, provided is a system for communication with an intelligent industrial assistant and industrial machine. In some non-limiting embodiments, a system for communication with an intelligent industrial assistant and industrial machine may include at least one processor and at least one non-transitory computer readable medium comprising instructions to direct the at least one processor to receive, via an intelligent industrial assistant, a first natural language input from a user. The first natural language input may be associated with a first command for an industrial machine to perform a first process. The intelligent industrial assistant may instruct the industrial machine to perform the first process based on the first natural language input. The intelligent industrial assistant may receive a second natural language input from the user while the industrial machine is performing the first process. The intelligent industrial assistant may determine a first response based on the second natural language input. The intelligent industrial assistant may initiate communication of the first response to the user while the industrial machine is performing the first process.

In some non-limiting embodiments, the first response may be based on a first context. Additionally or alternatively, the first context may be based on at least one of the first process running on the industrial machine, one or more processes of a work cell that includes the industrial machine, a type of the industrial machine, a role of the user, any combination thereof, and/or the like.

In some non-limiting embodiments, the intelligent industrial assistant may receive event data associated with a first event from the industrial machine. Additionally or alternatively, the intelligent industrial assistant may interrupt the communication of the response to the user.

In some non-limiting embodiments, before interrupting the communication of the response, the intelligent industrial assistant may determine whether to interrupt the communication of the first response based on the event data.

In some non-limiting embodiments, the intelligent industrial assistant may determine a second response based on the event data. Additionally or alternatively, the intelligent industrial assistant may initiate communication of the second response to the user.

In some non-limiting embodiments, upon completion of the communication of the second response to the user, the intelligent industrial assistant may continue communication of the first response to the user.

In some non-limiting embodiments, the second natural language input may be associated with at least one of a query of a database connected to the intelligent industrial assistant, a query regarding a status of the industrial machine, a query regarding a status of the first process, a request to set up a second process of the industrial machine, a request to generate a report associated with the industrial machine, a request to perform a third process by a second industrial machine, a request to coach the user how to perform a fourth process, a request to teach the user a new skill, any combination thereof, and/or the like.

In some non-limiting embodiments, the first response may include at least one of coaching the user how to perform a second process, teaching the user a new skill, any combination thereof, and/or the like.

In some non-limiting embodiments, the event may include an alarm of the industrial machine. Additionally or alternatively, the intelligent industrial assistant may instruct the industrial machine to stop the first process based on the alarm.

According to non-limiting embodiments, provided is a computer program product for communication with an intelligent industrial assistant and industrial machine. The computer program product may include at least one non-transitory computer-readable medium including one or more instructions that, when executed by at least one processor, cause the at least one processor to receive, via an intelligent industrial assistant, a first natural language input from a user. The first natural language input may be associated with a first command for an industrial machine to perform a first process. The intelligent industrial assistant may instruct the industrial machine to perform the first process based on the first natural language input. The intelligent industrial assistant may receive a second natural language input from the user while the industrial machine is performing the first process. The intelligent industrial assistant may determine a first response based on the second natural language input. The intelligent industrial assistant may initiate communication of the first response to the user while the industrial machine is performing the first process.

In some non-limiting embodiments, the first response may be based on a first context. Additionally or alternatively, the first context may be based on at least one of the first process running on the industrial machine, one or more processes of a work cell that includes the industrial machine, a type of the industrial machine, a role of the user, any combination thereof, and/or the like.

In some non-limiting embodiments, the intelligent industrial assistant may receive event data associated with a first event from the industrial machine. Additionally or alternatively, the intelligent industrial assistant may interrupt the communication of the response to the user.

In some non-limiting embodiments, before interrupting the communication of the response, the intelligent industrial assistant may determine whether to interrupt the communication of the first response based on the event data.

In some non-limiting embodiments, the intelligent industrial assistant may determine a second response based on the event data. Additionally or alternatively, the intelligent industrial assistant may initiate communication of the second response to the user.

In some non-limiting embodiments, upon completion of the communication of the second response to the user, the intelligent industrial assistant may continue communication of the first response to the user.

In some non-limiting embodiments, the second natural language input may be associated with at least one of a query of a database connected to the intelligent industrial assistant, a query regarding a status of the industrial machine, a query regarding a status of the first process, a request to set up a second process of the industrial machine, a request to generate a report associated with the industrial machine, a request to perform a third process by a second industrial machine, a request to coach the user how to perform a fourth process, a request to teach the user a new skill, any combination thereof, and/or the like.

In some non-limiting embodiments, the first response may include at least one of coaching the user how to perform a second process, teaching the user a new skill, any combination thereof, and/or the like.

In some non-limiting embodiments, the event may include an alarm of the industrial machine. Additionally or alternatively, the intelligent industrial assistant may instruct the industrial machine to stop the first process based on the alarm.

Further embodiments or aspects are set forth in the following numbered clauses:

Clause 1: A method for communication with an intelligent industrial assistant and industrial machine, comprising: receiving, by an intelligent industrial assistant, a first natural language input from a user, the first natural language input associated with a first command for an industrial machine to perform a first process; instructing, by the intelligent industrial assistant, the industrial machine to perform the first process based on the first natural language input; receiving, by the intelligent industrial assistant, a second natural language input from the user while the industrial machine is performing the first process; determining, by the intelligent industrial assistant, a first response based on the second natural language input; and initiating, by the intelligent industrial assistant, communication of the first response to the user while the industrial machine is performing the first process.

Clause 2: The method of clause 1, wherein the first response is based on a first context, and wherein the first context is based on at least one of the first process running on the industrial machine, one or more processes of a work cell that includes the industrial machine, a type of the industrial machine, or a role of the user.

Clause 3: The method of clause 1 or 2, further comprising: receiving, by the intelligent industrial assistant, event data associated with a first event from the industrial machine; and interrupting, by the intelligent industrial assistant, the communication of the response to the user.

Clause 4: The method of any preceding clause, further comprising, before interrupting the communication of the response, determining, by the intelligent industrial assistant, whether to interrupt the communication of the first response based on the event data.

Clause 5: The method of any preceding clause, further comprising: determining, by the intelligent industrial assistant, a second response based on the event data; and initiating, by the intelligent industrial assistant, communication of the second response to the user.

Clause 6: The method of any preceding clause, further comprising: upon completion of the communication of the second response to the user, continuing, by the intelligent industrial assistant, communication of the first response to the user.

Clause 7: The method of any preceding clause, wherein the second natural language input is associated with at least one of a query of a database connected to the intelligent industrial assistant, a query regarding a status of the industrial machine, a query regarding a status of the first process, a request to set up a second process of the industrial machine, a request to generate a report associated with the industrial machine, a request to perform a third process by a second industrial machine, a request to coach the user how to perform a fourth process, or a request to teach the user a new skill.

Clause 8: The method of any preceding clause, wherein the first response comprises at least one of coaching the user how to perform a second process or teaching the user a new skill.

Clause 9: The method of any preceding clause, wherein the event comprises an alarm of the industrial machine.

Clause 10: The method of any preceding clause, further comprising: instructing, by the intelligent industrial assistant, the industrial machine to stop the first process based on the alarm.

Clause 11. A system for communication with an intelligent industrial assistant and industrial machine, comprising: at least one processor; and at least one non-transitory computer readable medium comprising instructions to direct the at least one processor to: receive, via an intelligent industrial assistant, a first natural language input from a user, the first natural language input associated with a first command for an industrial machine to perform a first process; instruct, via the intelligent industrial assistant, the industrial machine to perform the first process based on the first natural language input; receive, via the intelligent industrial assistant, a second natural language input from the user while the industrial machine is performing the first process; determine, via the intelligent industrial assistant, a first response based on the second natural language input; and initiate, via the intelligent industrial assistant, communication of the first response to the user while the industrial machine is performing the first process.

Clause 12: The system of clause 11, wherein the first response is based on a first context, and wherein the first context is based on at least one of the first process running on the industrial machine, one or more processes of a work cell that includes the industrial machine, a type of the industrial machine, or a role of the user.

Clause 13: The system of clause 11 or 12, wherein the instructions further direct the at least one processor to: receive, by the intelligent industrial assistant, event data associated with a first event from the industrial machine; and interrupt, by the intelligent industrial assistant, the communication of the response to the user.

Clause 14: The system of any one of clauses 11-13, wherein the instructions further direct the at least one processor to, before interrupting the communication of the response, determine, by the intelligent industrial assistant, whether to interrupt the communication of the first response based on the event data.

Clause 15: The system of any one of clauses 11-14, wherein the instructions further direct the at least one processor to: determine, by the intelligent industrial assistant, a second response based on the event data; and initiate, by the intelligent industrial assistant, communication of the second response to the user.

Clause 16: The system of any one of clauses 11-15, wherein the instructions further direct the at least one processor to: upon completion of the communication of the second response to the user, continue, by the intelligent industrial assistant, communication of the first response to the user.

Clause 17: The system of any one of clauses 11-16, wherein the second natural language input is associated with at least one of a query of a database connected to the intelligent industrial assistant, a query regarding a status of the industrial machine, a query regarding a status of the first process, a request to set up a second process of the industrial machine, a request to generate a report associated with the industrial machine, a request to perform a third process by a second industrial machine, a request to coach the user how to perform a fourth process, or a request to teach the user a new skill.

Clause 18: The system of any one of clauses 11-17, wherein the first response comprises at least one of coaching the user how to perform a second process or teaching the user a new skill.

Clause 19: The system of any one of clauses 11-18, wherein the event comprises an alarm of the industrial machine.

Clause 20: The system of any one of clauses 11-19, wherein the instructions further direct the at least one processor to: instruct, by the intelligent industrial assistant, the industrial machine to stop the first process based on the alarm.

Clause 21. A computer program product for communication with an intelligent industrial assistant and industrial machine, the computer program product comprising at least one non-transitory computer-readable medium including one or more instructions that, when executed by at least one processor, cause the at least one processor to: receive, via an intelligent industrial assistant, a first natural language input from a user, the first natural language input associated with a first command for an industrial machine to perform a first process; instruct, via the intelligent industrial assistant, the industrial machine to perform the first process based on the first natural language input; receive, via the intelligent industrial assistant, a second natural language input from the user while the industrial machine is performing the first process; determine, via the intelligent industrial assistant, a first response based on the second natural language input; and initiate, via the intelligent industrial assistant, communication of the first response to the user while the industrial machine is performing the first process.

Clause 22: The computer program product of clause 21, wherein the first response is based on a first context, and wherein the first context is based on at least one of the first process running on the industrial machine, one or more processes of a work cell that includes the industrial machine, a type of the industrial machine, or a role of the user.

Clause 23: The computer program product of clause 21 or 22, wherein the instructions further direct the at least one processor to: receive, by the intelligent industrial assistant, event data associated with a first event from the industrial machine; and interrupt, by the intelligent industrial assistant, the communication of the response to the user.

Clause 24: The computer program product of any one of clauses 21-23, wherein the instructions further direct the at least one processor to, before interrupting the communication of the response, determine, by the intelligent industrial assistant, whether to interrupt the communication of the first response based on the event data.

Clause 25: The computer program product of any one of clauses 21-24, wherein the instructions further direct the at least one processor to: determine, by the intelligent industrial assistant, a second response based on the event data; and initiate, by the intelligent industrial assistant, communication of the second response to the user.

Clause 26: The computer program product of any one of clauses 21-25, wherein the instructions further direct the at least one processor to: upon completion of the communication of the second response to the user, continue, by the intelligent industrial assistant, communication of the first response to the user.

Clause 27: The computer program product of any one of clauses 21-26, wherein the second natural language input is associated with at least one of a query of a database connected to the intelligent industrial assistant, a query regarding a status of the industrial machine, a query regarding a status of the first process, a request to set up a second process of the industrial machine, a request to generate a report associated with the industrial machine, a request to perform a third process by a second industrial machine, a request to coach the user how to perform a fourth process, or a request to teach the user a new skill.

Clause 28: The computer program product of any one of clauses 21-27, wherein the first response comprises at least one of coaching the user how to perform a second process or teaching the user a new skill.

Clause 29: The computer program product of any one of clauses 21-28, wherein the event comprises an alarm of the industrial machine.

Clause 30: The computer program product of any one of clauses 21-29, wherein the instructions further direct the at least one processor to: instruct, by the intelligent industrial assistant, the industrial machine to stop the first process based on the alarm.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, as well as the attached Appendix, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1A:
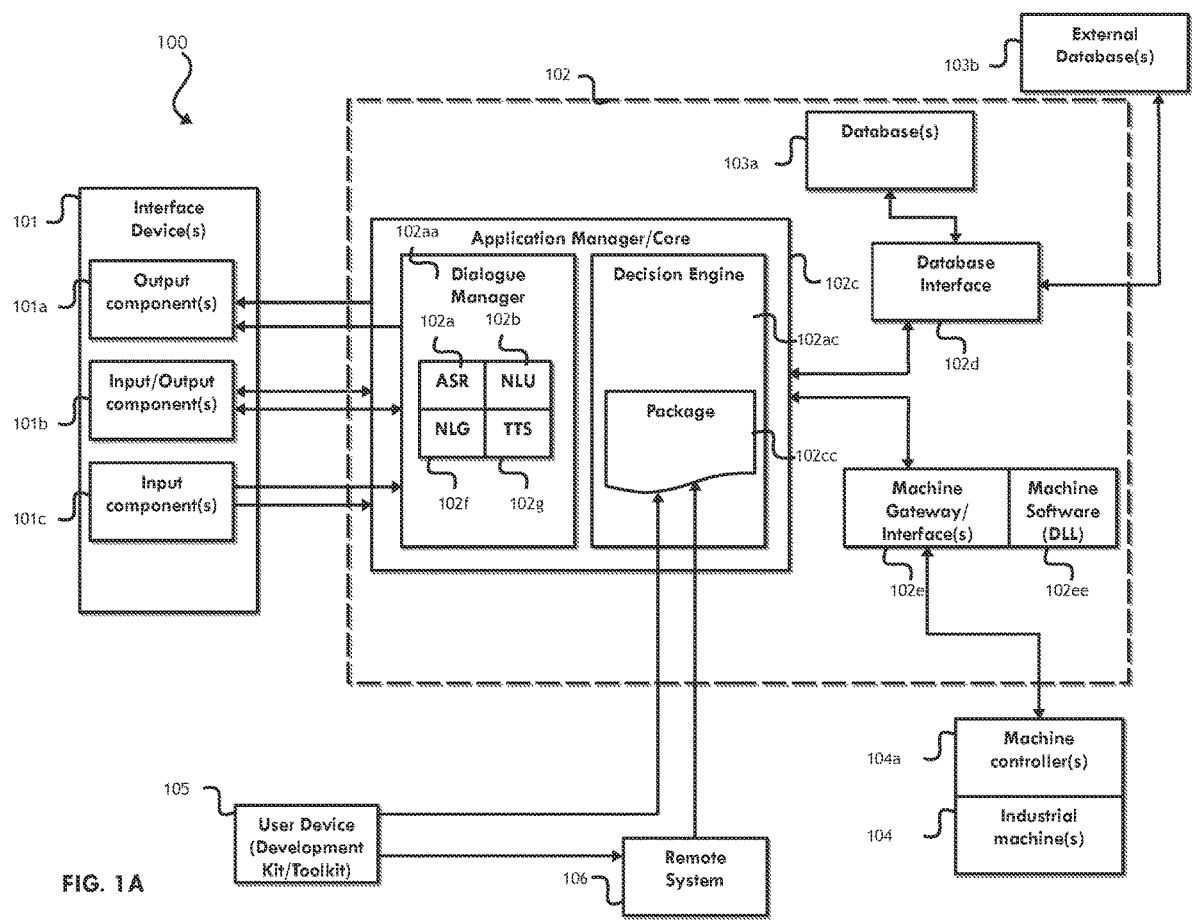
FIGS. 1A-1E are diagrams of non-limiting embodiments of an environment in which methods, systems, and/or computer program products, described herein, may be implemented according to the principles of the presently disclosed subject matter.
Figure 1B:
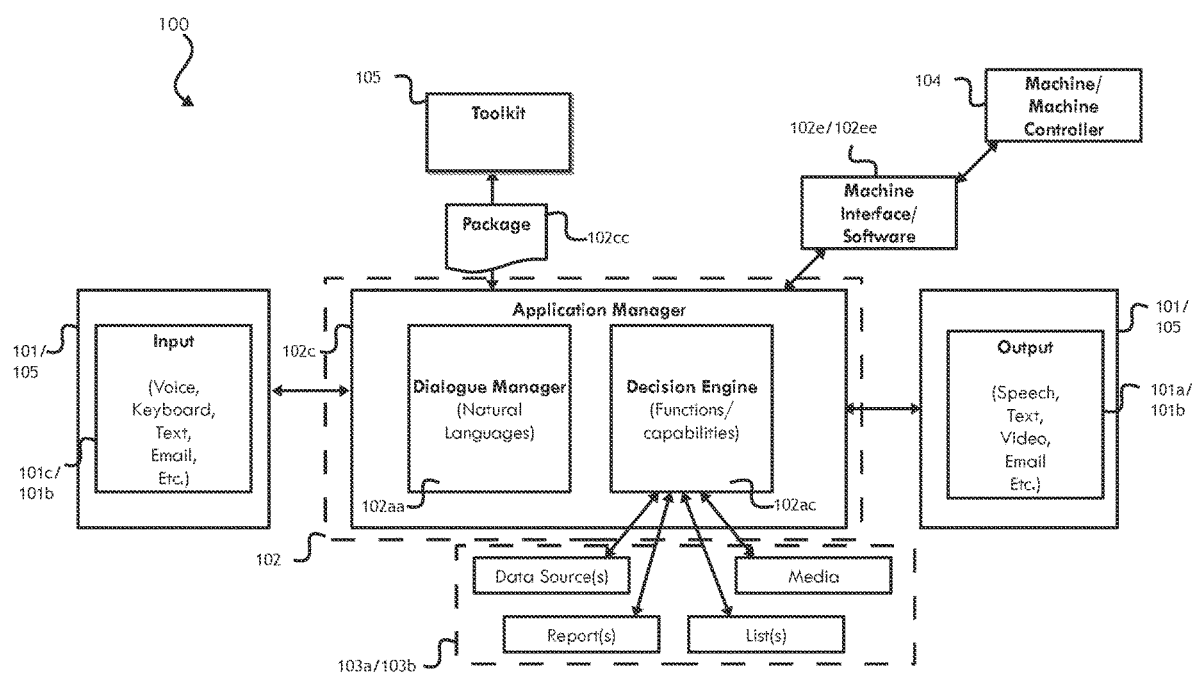
Figure 1C:
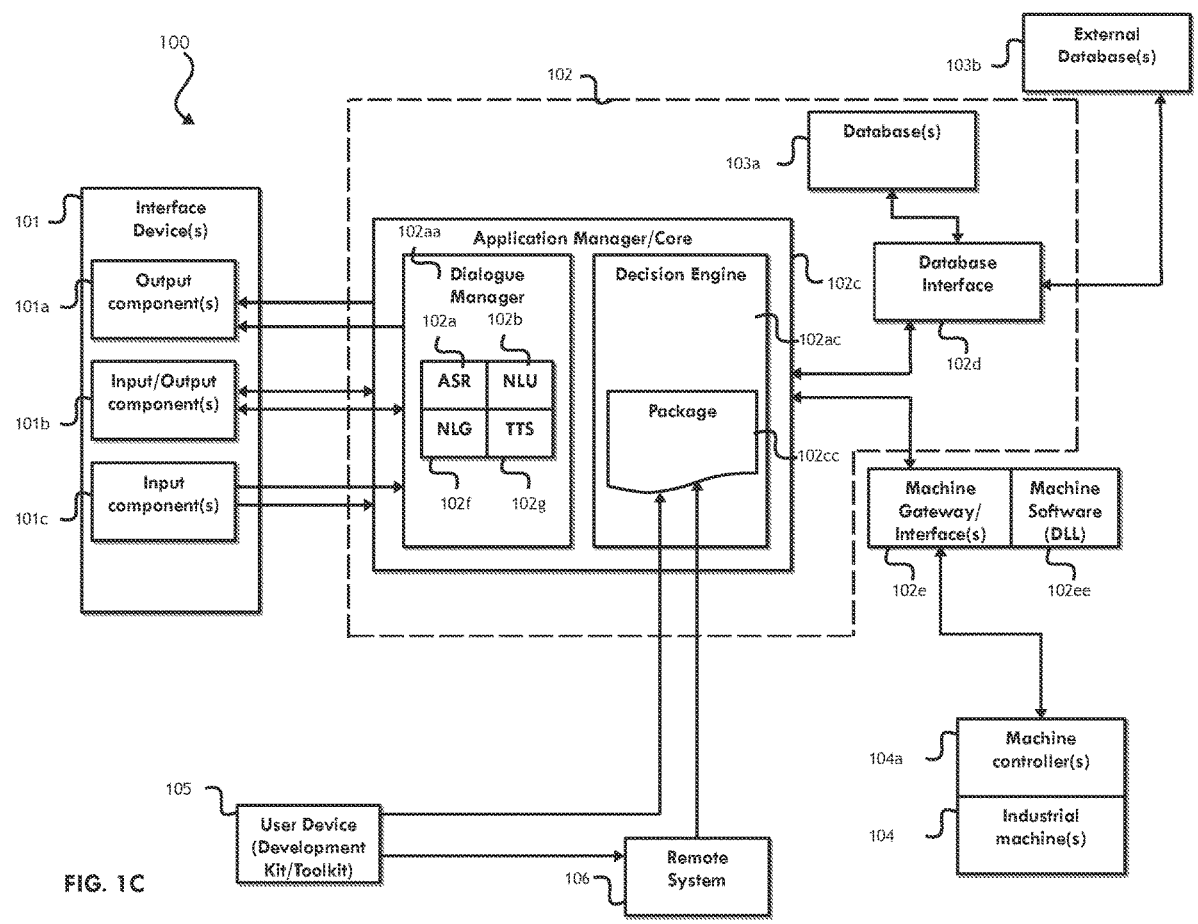
Figure 1D:
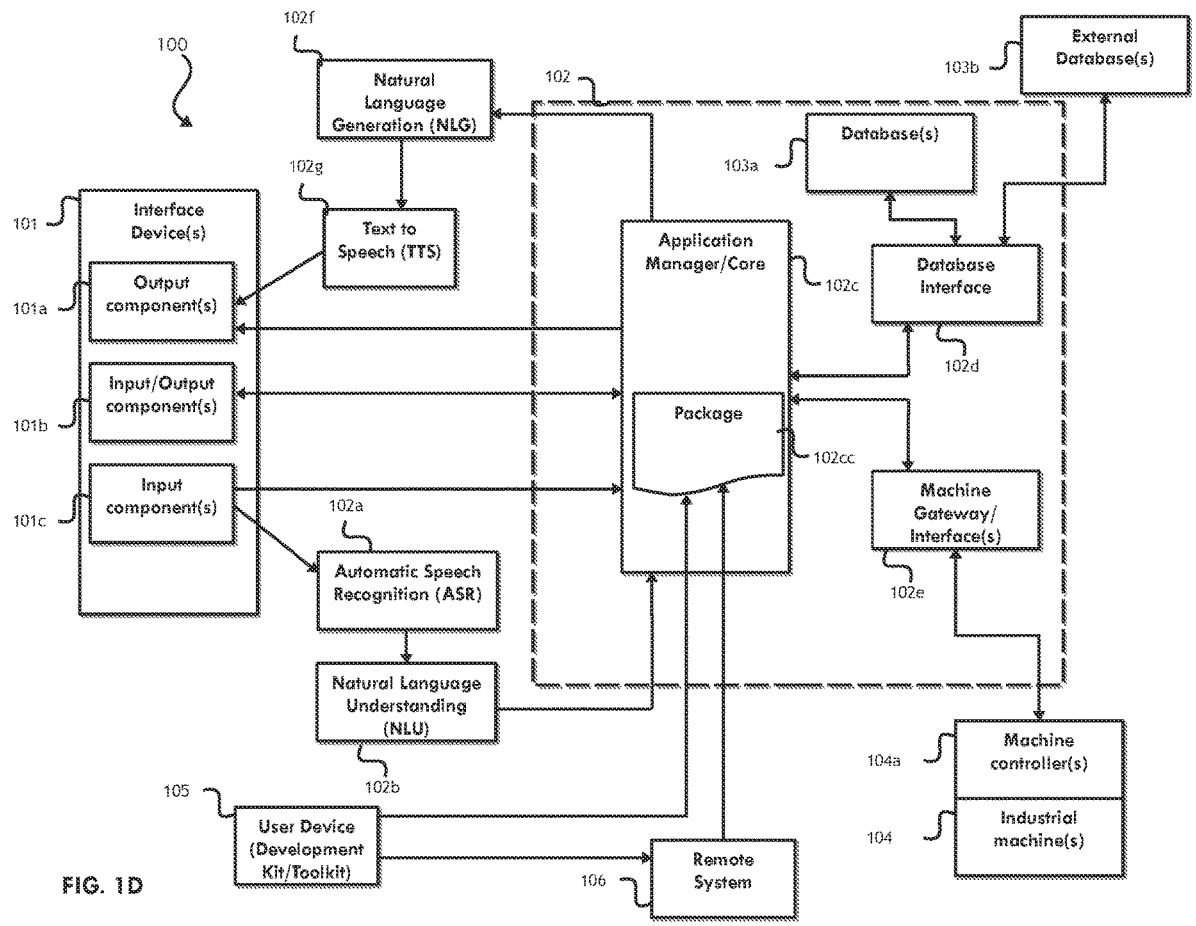
Figure 1E:
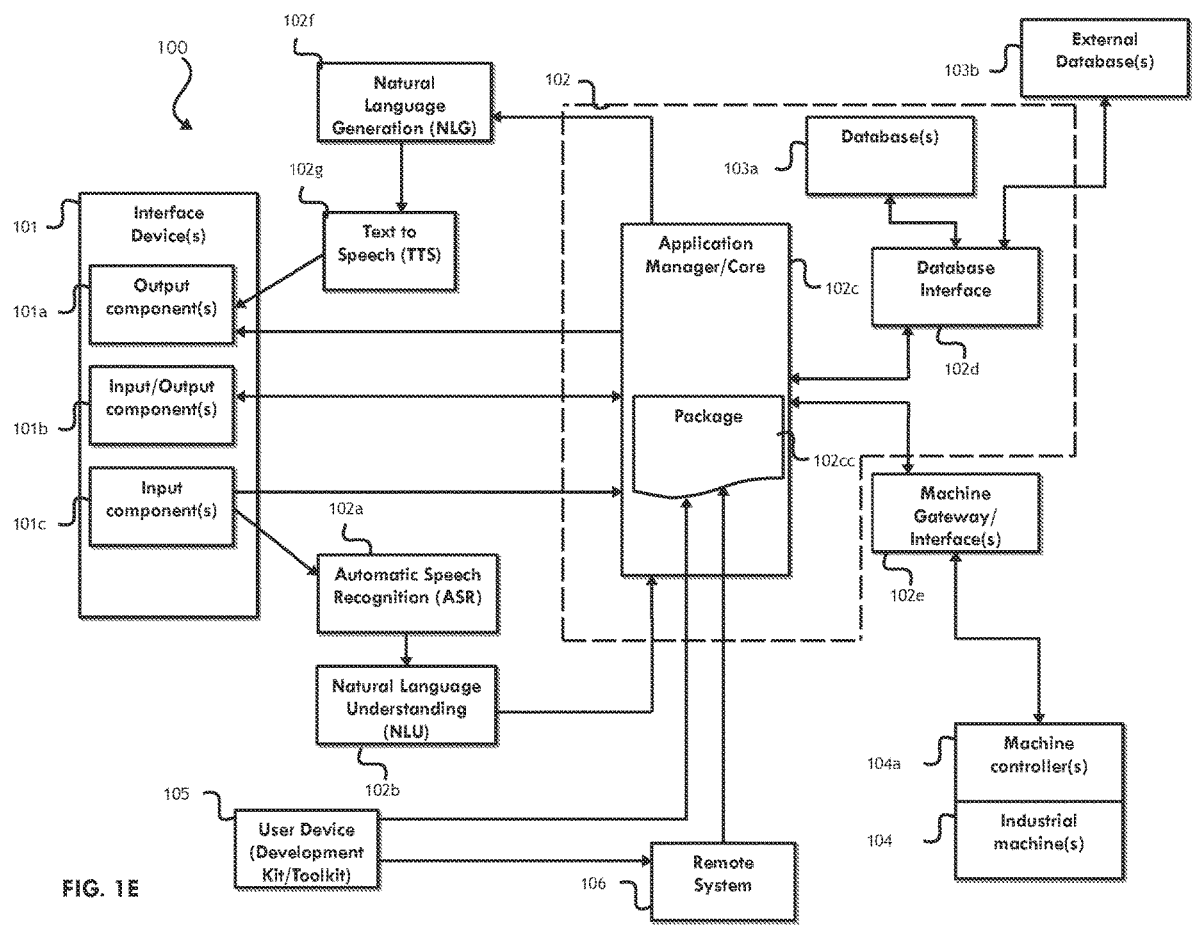

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

The terms "digital assistant," "virtual assistant," "intelligent automated assistant," or "automatic digital assistant" may refer to any information processing system that interprets natural language input in spoken and/or textual form to infer user intent, and performs actions based on the inferred user intent. The term "intelligent industrial assistant" may refer to an information processing system that is specifically designed, constructed, and/or implemented to interpret natural language input and/or inputs from industrial machines (e.g., manufacturing machines and/or the like), databases related thereto, and/or the like and perform actions based on the inferred intent in the context of or in relation to such industrial machines. For example, to act on an inferred intent, the intelligent industrial assistant may perform one or more of the following: identifying a task flow in the context of or in relation to at least one industrial machine with steps and parameters designed to accomplish the inferred intent; inputting specific requirements from the inferred intent into the task flow; executing the task flow by invoking programs, methods, services, APIs, or the like, e.g., to report, control, coach, calculate, plan, maintain, repair, teach, anticipate, record and/or the like in the context of or in relation to at least one industrial machine; and generating output responses to the user in an appropriate medium and/or mode, e.g., audible (e.g., speech, tone, and/or the like), text (e.g., text message, email, document, and/or the like), other visual form (e.g., graphic, video, and/or the like), any combination thereof, and/or the like.

Non-limiting embodiments or aspects of the disclosed subject matter are directed to methods, systems, and computer program products for communication with an intelligent industrial assistant and industrial machine. For example, non-limiting embodiments of the disclosed subject matter provide communication with an intelligent industrial assistant and industrial machine based on receiving a second natural language input while an industrial machine is performing a first process according to a first natural language input and providing a response to the second natural language input asynchronously (e.g., while the industrial machine performs the first process). Such embodiments provide techniques and systems that enable a user (e.g., machine operator) to provide additional inputs to a controller (e.g., intelligent industrial assistant) and receive additional responses therefrom asynchronously, e.g., concurrently with, simultaneously with, during, and/or the like execution of a process/function of an industrial machine.

Additionally or alternatively, non-limiting embodiments or aspects of the disclosed subject matter are directed to methods, systems, and computer program products for an intelligent industrial assistant. For example, non-limiting embodiments of the disclosed subject matter provide using an intelligent industrial assistant based on mapping natural language input to at least one dialogue template included in package data to determine and communicate command data based thereon. Such embodiments provide techniques and systems that enable a user (e.g., operator of an industrial machine and/or the like) to use natural language inputs (e.g., spoken requests and/or the like), which may reduce and/or eliminate training to use individual machines (e.g., industrial machines). Additionally or alternatively, such embodiments provide techniques and systems that reduce and/or eliminate manual efforts (e.g., navigating through menus, multiple key strokes, clicks, and/or the like), time, and/or the like of such a user controlling a machine (e.g., industrial machine and/or the like). Additionally or alternatively, such embodiments provide techniques and systems that allow such a user to concurrently (e.g., simultaneously, contemporaneously, and/or the like) control, monitor, and/or the like multiple machines through a single intelligent industrial assistant. Additionally or alternatively, such embodiments provide techniques and systems that enable a user (e.g., operator of an industrial machine and/or the like) to control, monitor, and/or the like a machine without using the user's hands (e.g., when a user's hands are occupied, such as when carrying an object, writing notes, assisting another individual on the factory floor, and/or the like). Additionally or alternatively, such embodiments provide techniques and systems that enable such a user to receive indications of status or other information in various formats including non-visual formats (e.g., audible and/or the like), thereby reducing and/or eliminating a need for such a user to be physically near and/or looking at a machine while operating such a machine.

Additionally or alternatively, non-limiting embodiments or aspects of the disclosed subject matter provide techniques and systems for interoperability, e.g., determining which medium and/or mode of communication (e.g., audible, text, HTML, visual, any combination thereof, and/or the like) to use for output to a user from the intelligent industrial assistant. In some non-limiting embodiments, such determination may be based on ethnographic relationship(s), ethnographic mapping(s), and/or the like, which may be specific to users (e.g., operators) of industrial machines and/or related thereto. Additionally or alternatively, non-limiting embodiments of the disclosed subject matter provide techniques and systems for universality, e.g., allowing a single user (e.g., machine operator and/or the like) to operate many different devices (e.g., industrial machines, databases related thereto, and/or the like) through a single interface of the intelligent industrial assistant. For the purpose of illustration, a person knowledgeable regarding a type of industrial machine (e.g., machine tool, additive manufacturing device, subtractive manufacturing device, electrical discharge machining (EDM) device, milling device, cutting device grinding device, drilling device, micromachining device, part-producing device, and/or the like) may be able to operate many different devices of that type from different manufacturers/sources without a need to learn a separate interface/control system for each such machine. Additionally or alternatively, non-limiting embodiments or aspects of the disclosed subject matter provide techniques and systems for enablement of a user (e.g., operator, worker, and/or the like), e.g., in understanding and operating industrial machines, databases related thereto, and/or the like through the intelligent industrial assistant. For the purpose of illustration, the intelligent industrial assistant may enable a user (e.g., operator, worker, and/or the like) with respect to the industrial machine, databases related thereto, and/or the like, e.g., to understand, be prompted to, or be coached/taught how to control various types of machines; understand or be prompted about upcoming steps, processes, and/or the like; understand or be prompted about what is needed (e.g., parameters, requirements, materials, tools, and/or the like); understand or be informed of relevant information in a database (e.g., without being familiar with the particular database or how to perform searches, queries, and/or the like thereof); and/or the like.

For the purpose of illustration, in the following description, while the presently disclosed subject matter is described with respect to methods, systems, and computer program products for an intelligent industrial assistant, e.g., communication with an intelligent assistant and industrial machine, one skilled in the art will recognize that the disclosed subject matter is not limited to the illustrative embodiments or aspects. For example, the methods, systems, and computer program products described herein may be used with a wide variety of settings, such as any setting suitable for an intelligent industrial assistant.

Referring now to FIGS. 1A-1E, FIGS. 1A-1E are diagrams of non-limiting embodiments of environment 100 in which systems, products, and/or methods, as described herein, may be implemented. As shown in FIGS. 1A-1E, environment 100 may include interface device 101, intelligent industrial assistant 102, database 103a, external database 103b, industrial machine 104, user device 105, and/or remote system 106.

Interface device 101 may include one or more devices capable of receiving information from and/or communicating information to intelligent industrial assistant 102 (e.g., via direct connection, wired and/or wireless network, and/or any other suitable communication technique). Additionally or alternatively, each interface device 101 may include a device capable of receiving information from and/or communicating information to other interface devices 101 (e.g., via wired or wireless network and/or any other suitable communication technique), user device(s) 105, and/or remote system 106. In some non-limiting embodiments, interface device 101 may include one or more input components 101c, one or more output components 101a, one or more input/output component 101b (e.g., a component that performs as both an input component and an output component, such as a touchscreen display, a headset with microphone and speaker/headphone, and/or the like), and/or one or more communication interfaces, as described herein. In some non-limiting embodiments, interface device 101 may or may not be capable of receiving information (e.g., from intelligent industrial assistant 102 and/or from another interface device 101) via a short-range wireless communication connection (e.g., an NFC communication connection, an RFID communication connection, a Bluetooth® communication connection, a Zigbee® communication connection, and/or the like), and/or communicating information (e.g., to intelligent industrial assistant 102, another interface device 101, user device 105, remote system 106, and/or the like) via a short-range wireless communication connection. In some non-limiting embodiments, interface device 101 may include input component 101c (e.g., a microphone), an output component 101a (e.g., a speaker, headphone, and/or the like), an input/output component 101b (e.g., a touchscreen, a headset, and/or the like), and/or the like. In some non-limiting embodiments, interface device 101 may include multiple devices. For example, interface device 101 may include a headset including output component 101a (e.g., a speaker, such as headphones) and/or input component 101c (e.g., a microphone). Additionally or alternatively, interface device 101 may include a portable and/or handheld device (e.g., a computer, a laptop, a personal digital assistant (PDA), a smartphone, a tablet, and/or the like) with input and/or output components (e.g., input/output component 101b, such as a touchscreen; input components 101c such as a keyboard, a mouse, and/or the like; output components 101a such as a speaker and/or the like; and/or the like).

Intelligent industrial assistant 102 may include one or more devices capable of receiving information from and/or communicating information to interface device 101, database 103a, external database 103b, industrial machine 104, user device 105, and/or remote system 106. In some non-limiting embodiments, intelligent industrial assistant 102 may be integrated with (e.g., completely, partially, and/or the like) and/or directly connected to interface device 101. In some non-limiting embodiments, intelligent industrial assistant 102 may include a computing device, such as a portable and/or handheld device (e.g., a computer, a laptop, a personal digital assistant (PDA), a smartphone, a tablet, and/or the like), a desktop computer, a server, a group of servers, and/or other like devices. In some non-limiting embodiments, intelligent industrial assistant 102 may be associated with a service provider, e.g., a third party separate from the user of the interface device 101, the maintainer of the database 103a, the maintainer of the external database 103b, the operator/owner/provider/manufacturer of the industrial machine 104, the provider of remote system 106, and/or the user of user device 105. In some non-limiting embodiments, intelligent industrial assistant 102 may be in communication with a data storage device, which may be local or remote to intelligent industrial assistant 102. In some non-limiting embodiments, intelligent industrial assistant 102 may be capable of receiving information from, storing information in, communicating information to, or searching information stored in the data storage device.

In some non-limiting embodiments, intelligent industrial assistant 102 may have various hardware and/or software modules and/or may store information and/or software related to the operation and use of intelligent industrial assistant 102. For example, intelligent industrial assistant may 102 may include dialogue manager 102aa, decision engine 102ac, automatic speech recognition (ASR)/speech to text (STT) module 102a, natural language understanding (NLU) module 102b, application manager 102c, database-assistant interface 102d, machine gateway 102e, natural language generator (NLG) module 102f, text to speech (TTS) module 102g, and/or the like. Additionally or alternatively, database interface 102d may include a hardware and/or a software interface (e.g., an application-programming interface and/or the like) to enable communication between intelligent industrial assistant 102, database 103a, and/or external database 103b. In some non-limiting embodiments, application manager 102c may include at least one of dialogue manager 102aa, decision engine 102ac, any combination thereof and/or the like. Additionally or alternatively, dialogue manager 102aa may include at least one of ASR/STT module 102a, NLU module 102b, NLG module 102f, TTS module 102g, other speech processing, and/or the like. In some non-limiting embodiments, ASR/STT module 102a, NLU module 102b, other speech to text processing, and/or the like may be a single module (e.g., STT module 102a). Additionally or alternatively, NLG module 102f, TTS module 102g, other text to speech processing, and/or the like may be a single module (e.g., TTS module 102g). In some non-limiting embodiments, ASR/STT module 102a, NLU module 102b, other speech to text processing, NLG module 102f, TTS module 102g, other text to speech processing, and/or the like may be a single module (e.g., dialogue manager 102aa). In some non-limiting embodiments, at least one of ASR/STT module 102a, NLU module 102b, NLG module 102f, TTS module 102g, dialogue manager 102aa, a combination thereof, and/or the like may be separate from and/or in communication with intelligent industrial assistant 102. In some non-limiting embodiments, intelligent industrial assistant 102 and/or machine gateway 102e may include at least one machine interface, e.g., a hardware and/or a software interface (e.g., an application-programming interface, dynamic load library, and/or the like) to enable communication between the intelligent industrial assistant 102 (e.g., application manager 102c) and industrial machine 104 (e.g., machine controller 104a of industrial machine 104). Additionally or alternatively, in some non-limiting embodiments, intelligent industrial assistant 102, machine gateway 102e, and/or industrial machine 104 (e.g., machine controller 104a of industrial machine 104) may include machine-specific software 102ee (e.g., a dynamic load library (DLL)) to enable communication between the intelligent industrial assistant 102 (e.g., application manager 102c) and industrial machine 104 (e.g., machine controller 104a of industrial machine 104). For example, machine-specific software 102ee (e.g., DLL) may include a library of at least one of functions, commands, variables, fields, inputs, outputs, any combination thereof, and/or the like of industrial machine 104 (e.g., machine controller 104a of industrial machine 104) that are accessible, usable, and/or the like by intelligent industrial assistant 102 (e.g., application manager 102c). In some non-limiting embodiments, machine gateway 102e may be separate from and/or in communication with intelligent industrial assistant 102. For example, machine gateway may be implemented (e.g., completely, partially, and/or the like) with industrial machine 104 (e.g., machine controller 104a of industrial machine 104). In some non-limiting embodiments, intelligent industrial assistant 102 may include at least one output interface (e.g., an audio card, a video card, a renderer, a coder, a decoder, a coder-decoder (codec) a communication interface, and/or the like) to enable communication between the intelligent industrial assistant 102 (e.g., application manager 102c) and at least one of output component(s) 102a, input/output component(s) 102b, and/or the like.

In some non-limiting embodiments, application manager 102c may be an industrial process application manager. Additionally or alternatively, application manager 102c may include decision ending 102ac. In some non-limiting embodiments, application manager 102c (e.g., decision engine 102ac thereof and/or the like) may include, receive, and/or be configured with package 102cc. In some non-limiting embodiments, package 102cc may include at least one module (e.g., software module, firmware module, and/or the like) and/or package data that may include at least one of dialogue templates, machine/group identification data, features, sequences, actions, functions, commands, variables, fields, inputs, outputs, parameters, classes, interfaces (e.g., machine interface(s) of machine gateway 102e, database interface 102d, output interface 102h, and/or the like), any combination thereof, and/or the like of the intelligent industrial assistant 102 (e.g., application manager 102c, decision engine 102ac thereof, and/or the like). In some non-limiting embodiments, application manager 102c (e.g., decision engine 102ac thereof and/or the like) and/or package 102cc may include and/or be configured to determine ethnographic relationships, e.g., mapping(s) and/or cross-correlations between functions performable by intelligent industrial assistant 102 (e.g., report, control, coach, calculate, plan, maintain, repair, teach, anticipate, record and/or the like) and sequences/task groups (e.g., task flows of users specific to the role of such user, such as machine operator, and/or the like). Additionally or alternatively, application manager 102c (e.g., decision engine 102ac thereof and/or the like) and/or package 102cc may include and/or be configured to determine mappings to industrial machine(s) 104 and/or databases (e.g., database(s) 103a and/or external database(s) 103b), which may be based (e.g., completely, partially, and/or the like) on one or more predetermined ethnographic relationship(s).

In some non-limiting embodiments, application manager 102c (e.g., dialog manager 102aa thereof, decision engine 102ac thereof, and/or the like) and/or package 102cc may include and/or be configured to implement interoperability, e.g., determining which medium and/or mode of communication (e.g., audible, text, HTML, visual, tactile, any combination thereof, and/or the like) to use for input from or output to a user from intelligent industrial assistant 102. In some non-limiting embodiments, such determination may be based on one or more predetermined ethnographic relationship(s), dialogue template(s), and/or the like. Additionally or alternatively, such a determination may be based on selecting a medium and/or mode of communication that reduces (e.g., minimizes and/or the like) a number of steps (e.g., successive iterations of inputs and/or outputs) by the user using the intelligent industrial assistant 102. Additionally or alternatively, such a determination may be based on providing a way to accomplish a task (e.g., at least one action and/or the like) that increases efficiency, effectiveness, and/or the like. Additionally or alternatively, such a determination may be based on selecting a medium and/or mode of communication to reduce (e.g., eliminate, decrease, and/or the like) inputs requiring a use of the user's hands (e.g., enable voice/speech input and/or voice/speech output to allow a user to operate a machine without the user's hands), thereby enabling the user to interact with intelligent industrial assistant 102 while the user's hands are occupied. In some non-limiting embodiments, if content (e.g., a response, a prompt, and/or the like) is short (e.g., concise, less than a threshold number of characters, less than a threshold number of words (e.g., 10 words), less than a threshold number of sentences, less than a threshold number of seconds of speech (e.g., 5 seconds), and/or the like), such content may be output by intelligent industrial assistant 102 audibly (e.g., spoken words), as text (e.g., in dialogue window on a display screen, as part of an HTML page, and/or the like), and/or the like. In some non-limiting embodiments, a user (e.g., machine operator and/or the like) may not be able to (e.g., be prevented from and/or the like) providing input (e.g., natural language input) until audible output (e.g., spoken words of a response) is completed, so content that is long (e.g., greater than the aforementioned thresholds and/or the like) may be undesirable, cause delays in time, and/or the like. In some non-limiting embodiments, when content includes the results of at least one calculation, such content may be out in a tabular format (e.g., a tabular list), a report template, and/or the like. Additionally or alternatively, such output (e.g. tabular list, report template, and/or the like) may be displayed in a separate window (e.g., on the display screen), communicated by a separate channel (e.g., email, text (e.g., SMS) message, multimedia (e.g., MMS) message, and/or the like). Additionally or alternatively, a user may optionally be able to select (e.g., touch on a touch screen, click with a pointer device such as a mouse, and/or the like) an item in such a list rather than or in addition to providing subsequent natural language input (e.g., voice/speech input, typed input, and/or the like), e.g., when the item may be cumbersome to speak or type (e.g., a word greater than a threshold length, a string of words greater than a threshold number of words, a number with multiple digits greater than a threshold number of digits, and/or the like). In some non-limiting embodiments, if content includes identification information (e.g., contact information, email addresses, phone numbers, and/or the like), such content may be displayed (e.g., in a dialogue window, in a separate window on the display screen, and/or the like). In some non-limiting embodiments, number values with multiple digits following a decimal point may be rounded to a selected (e.g., predetermined, selectable, and/or the like) number of digits after the decimal before being output (e.g., as audible speech, text in a dialogue window, text on an HTML page, and/or the like). In some non-limiting embodiments, when content includes at least one media item, such media item may be displayed in a separate window (e.g., on a display screen and/or the like). Additionally or alternatively, large media items (e.g., greater than a threshold number of pages (e.g., for documents), seconds (e.g., for audio, visual, or audiovisual files), and/or the like) may be divided (e.g., segmented and/or the like) into smaller media items, which may reduce load times. Additionally or alternatively, such smaller media items may be displayed serially, concurrently, and/or the like. In some non-limiting embodiments, when content includes warnings (e.g., alarms, alerts, and/or the like), such content may include at least one of audible output (e.g., spoken words, loud and/or repetitive noises, tones, and/or the like), visual output (e.g., display in the dialogue window, in a separate window, and/or the like), communication by at least one other channel (e.g., email, text (e.g., SMS) message, multimedia (e.g., MMS) message, and/or the like), any combination thereof, and/or the like. In some non-limiting embodiments, output (e.g., content, media items, warnings, and/or the like) may include tactile output (e.g., haptic, vibration, and/or the like output). In some non-limiting embodiments, output (e.g., content, media items, warnings, and/or the like) may include a combination of modes of communication, e.g., tactile and visual (e.g., via a touchscreen), visual and audible (e.g., display of information in a dialogue window with accompanying audible speech, audiovisual media content, and/or the like), and/or the like. In some non-limiting embodiments, intelligent industrial assistant 102 may include an image capture device (e.g., camera, barcode scanner, and/or the like as at least one of input component 101c, input/output component 101b, and/or the like), which may be used to input data (e.g., barcode, quick response (QR) code, alphanumeric information, optical character recognition, and/or the like), and/or intelligent industrial assistant 102 may display (e.g., via a display screen as output component 101a, input/output component 101b, and/or the like) such data (e.g., barcode, quick response (QR) code, alphanumeric information, and/or the like) as output. In some non-limiting embodiments, output may include indications of status or other information in various formats including non-visual formats (e.g., audible and/or the like), thereby reducing and/or eliminating a need for such a user to be physically near and/or looking at a machine while operating such a machine.

In some non-limiting embodiments, each dialogue template (e.g., of package 102cc and/or the like) may include at least one of function data, group data, feature data, sequence data, parameter data, expected dialogue data, action data, any combination thereof, and/or the like. For example, function data may be associated with (e.g., identify and/or the like) of at least one function (e.g., report, control, coach, calculate, plan, maintain, repair, teach, anticipate, record and/or the like) of intelligent industrial assistant 102 into which the dialogue template is categorized (e.g., classified and/or the like). Additionally or alternatively, group data may be associated with (e.g., identify and/or the like) a group of features (e.g., a group of features associated with an industrial machine 104, a database such as database 103a and/or external database 103b, and/or the like). For example, a group may include all features (e.g., functions, commands, variables, fields, inputs, outputs, any combination thereof, and/or the like) associated with a particular industrial machine 104. Additionally or alternatively, each industrial machine 104 (or make/model of industrial machines 104) may have at least one group associated therewith. In some non-limiting embodiments, the group data may include an alphanumeric string (e.g., a four digit number, a four character string, and/or the like). Additionally or alternatively, feature data may be associated with (e.g., identify and/or the like) a feature (e.g., a first feature) of the group of features. In some non-limiting embodiments, a feature may be associated with at least one operation for a user (e.g., machine operator and/or the like) to interact with intelligent industrial assistant 102. For example, a feature may include a direction, e.g., a request (e.g., command, question, and/or the like) for intelligent industrial assistant 102 to perform an action. Additionally or alternatively, a feature may include a confirmation, e.g., an input (e.g., spoken/verbal input, click, key stroke, and/or the like) to intelligent industrial assistant 102 confirming that intelligent industrial assistant 102 should perform an action (e.g., "yes," "no," "cancel," and/or the like). Additionally or alternatively, a feature may be a complex feature, e.g., a series of decision steps in which a user (e.g., machine operator and/or the like) provides multiple inputs (e.g., directions, confirmations, and/or the like) to intelligent industrial assistant 102 in at least one specified sequence. Additionally or alternatively, a feature may include a compound feature, e.g., a batch of actions, which may be performed in parallel, in series, any combination thereof, and/or the like. In some non-limiting embodiments, sequence data may be associated with (e.g., identify, include, and/or the like) a sequence of expected dialogue by the user (e.g., machine operator and/or the like), by intelligent industrial assistant 102, and/or the like. For example, sequence data may be associated with (e.g., identify, include, and/or the like) at least one item of expected dialogue data. Additionally or alternatively, expected dialogue data may be associated with (e.g., identify, include, and/or the like) at least one item of expected dialogue of the sequence. For example, each item of expected dialogue may include at least one of an expected natural language input from the user (e.g., machine operator), a response from intelligent industrial assistant 102 to the user, and/or the like. In some non-limiting embodiments, expected dialogue data may include a plurality of alternative items of expected dialogue associated with one dialogue template. For example, the plurality of alternative items of expected dialogue may include synonyms, alternative phrasings, and/or the like that express a same intent of the user to perform an activity (e.g., at least one action, task, and/or the like) associated with the same dialogue template (e.g., "Start warm up cycle," "Warm up the machine," and/or the like may be alternative items of expected dialogue to initiate a warm-up process for an industrial machine 104; "Run process 1234," "Start m-code 1234," and/or the like may be alternative items of expected dialogue to initiate a process associated with the stated code; "Report current tool," "Inform about current tool," and/or the like may be alternative items of expected dialogue to request information on a current tool; "Turn on the lights," "Lights on," and/or the like may be alternative items of expected dialogue to request turning on the lights; and/or the like). In some non-limiting embodiments, expected dialogue data may include initiating dialogue data associated with at least one natural language input (e.g., phrase and/or the like) for initiating the sequence associated with the expected dialogue data. In some non-limiting embodiments, parameter data may be associated with (e.g., identify, include, and/or the like) at least one parameter (e.g., value, category, word, and/or the like) associated with at least one item of expected dialogue. For example, parameter data may be associated with a part number, a part identification, a machine number (e.g., of a particular industrial machine 104, a model of industrial machine 104, and/or the like), a machine identifier, a number, a category (e.g., low, medium, high, slow, fast, on, off, and/or the like), a word (e.g., name of a part, a machine, a database, an item of media, and/or the like), an alphanumeric string, and/or the like. In some non-limiting embodiments, at least one item of parameter data may be associated with input from the user to intelligent industrial assistant 102. Additionally or alternatively, at least one item of parameter data may be associated with output (e.g., response and/or the like) from intelligent industrial assistant 102. In some non-limiting embodiments, action data may be associated with (e.g., identify and/or the like) at least one action performable by intelligent industrial assistant 102, at least one action performable by another device (e.g., industrial machine 104, database 103a, external database 103b, and/or the like) separate from intelligent industrial assistant 102 (which may be at least partially controlled by intelligent industrial assistant 102), and/or the like. In some non-limiting embodiments, a dialogue template (e.g., the action data thereof and/or the like) may be associated with (e.g., identify, include, and/or the like) at least one of a media item, a tabular list, a report template, a machine interface, a database interface, custom content (e.g., of a user, the user's organization, and/or the like, which may be output by any suitable mode or medium of communication as described herein, such as email, text, visual display, audible output, and/or the like), an item of software (e.g., an executable file, a process, a module, a routine, a sub-routine, a function, and/or the like), a search (e.g., for a document, a retrievable item of data, and/or the like), a combination thereof, and/or the like.

In some non-limiting embodiments, certain actions may have prerequisites. For example, at least one of sequence data, action data, and/or the like may include prerequisite data associated with (e.g., identifying, including, and/or the like) at least one prerequisite (e.g., prerequisite action, prerequisite event, prerequisite condition, and/or the like). For example, warming up a machine (such as industrial machine 104) may be a prerequisite action to performing certain operations with such a machine, and sequence data, action data, and/or the like associated with such operations may include prerequisite data identifying sequence data, action data, and/or the like associated with warming up the machine. For example, a lack of warnings (e.g., alarms, alerts, and/or the like) may be a prerequisite condition to performing certain operations with a machine (e.g., industrial machine 104), and sequence data, action data, and/or the like associated with such operations may include prerequisite data identifying sequence data, action data, and/or the like associated with such warnings. In some non-limiting embodiments, intelligent industrial assistant 102 may prevent performing an action if the prerequisite is not satisfied. Additionally or alternatively, intelligent industrial assistant 102 may provide a response indicating such action cannot be performed and/or identifying the prerequisite to the user. In some non-limiting embodiments, intelligent industrial assistant 102 may communicate a prompt to the user requesting additional input associated with the prerequisite, confirmation associated with the prerequisite, and/or the like. Additionally or alternatively, if the user does not provide a reply to the prompt (e.g., because the user does not know), intelligent industrial assistant 102 may recommend a reply (e.g., at least on item of expected dialogue in response to the prompt, which may be based on the dialogue template, the expected dialogue data thereof, and/or the like). In some non-limiting embodiments, the machine (e.g., industrial machine 104, machine interface 102e thereof, machine-specific software 102ee of industrial machine 104, and/or the like) may include code (e.g., software, firmware, protocols, executable instructions, parameters, and/or the like) to perform certain actions, and such code may include prerequisite data (e.g., dependencies and/or the like) identifying prerequisites of at least one some the actions.

In some non-limiting embodiments, at least one of (e.g., each of) ASR module 102a, NLU module 102b, NLG module 102f, TTS module 102g, application manager 102c (e.g., dialogue manager 102aa thereof, decision engine 102ac thereof, and/or the like), and/or package 102cc may include and/or be configured to implement a corpus of vocabulary (e.g., customized lexicon and/or the like). In some non-limiting embodiments, at least a portion of the corpus of vocabulary may be specific to the environment, e.g., in the context of or in relation to manufacturing generally; one or more specific types of manufacturing; industrial machines generally; one or more specific types of industrial machines; industrial processes generally; one or more specific industrial processes; databases related to manufacturing, industrial machines, and/or industrial processes; standard work and/or task flows related to manufacturing, industrial machines, and/or industrial processes; and/or the like. Additionally or alternatively, at least a portion of the corpus of vocabulary may be specific to one or more roles of individuals e.g., in the context of or in relation to manufacturing; industrial machines; industrial processes; databases related to manufacturing, industrial machines, and/or industrial processes; standard work and/or task flows related to manufacturing, industrial machines, and/or industrial processes; and/or the like. For example, such roles may include an operator (e.g., machine operator) of industrial machines in general, an operator of one or more specific types of industrial machines, a factory floor staff member, a supervisor, a manager (e.g., operations manager, production manager, and/or the like), an engineer (e.g., manufacturing engineer, field service engineer, and/or the like), a maintenance worker, a salesman, an inspector, an analyst, and/or the like. Additionally or alternatively, at least a portion of the corpus of vocabulary may be specific to technically-alike meanings, e.g., synonyms, metonyms, equivalents, associated words, substitutes, and/or the like. For example, at least some such technically-alike meanings may be based on predetermined ethnographic relationships.

Database 103a may include one or more devices capable of receiving information from and/or communicating information to intelligent industrial assistant 102. Additionally or alternatively, database 103a may include a data storage device, which may be local or remote to intelligent industrial assistant 102. In some non-limiting embodiments, database 103a may be integrated with (e.g., completely, partially, and/or the like) and/or directly connected to intelligent industrial assistant 102. Additionally or alternatively, database 103a may be implemented (e.g., completely, partially, and/or the like) separate from intelligent industrial assistant 102. For example, database 103a may be a separate device and/or system from intelligent industrial assistant 102. In some non-limiting embodiments, database 103a and intelligent industrial assistant 102 may be maintained by the same entity. In some non-limiting embodiments, database 103a may include a computing device, such as a server, a group of servers, and/or other like devices. In some non-limiting embodiments, database 103a may be capable of retrieving information from, storing information in, communicating information to, or searching information stored in the data storage device.

External database 103b may include one or more devices capable of receiving information from and/or communicating information to intelligent industrial assistant 102. Additionally or alternatively, external database 103b may include a data storage device, which may be local or remote to intelligent industrial assistant 102. In some non-limiting embodiments, external database 103b may be associated with a third party, e.g., separate from the user of interface device 101, intelligent industrial assistant 102, and/or the operator/owner/provider/manufacturer of the industrial machine 104. In some non-limiting embodiments, external database 103b and intelligent industrial assistant 102 may be maintained by the same entity (e.g., different groups within the same party). In some non-limiting embodiments, external database 103b may include a computing device, such as a server, a group of servers, and/or other like devices. In some non-limiting embodiments, external database 103b may be capable of retrieving information from, storing information in, communicating information to, or searching information stored in the data storage device.

Industrial machine 104 may include one or more devices capable of receiving information from and/or communicating information to intelligent industrial assistant 102. Additionally or alternatively, industrial machine 104 may include one or more devices capable of performing an industrial, manufacturing, machining, and/or physical task. For example, industrial machine 104 may include at least one of a machine tool, an additive manufacturing device, a subtractive manufacturing device, an electrical discharge machining (EDM) device, a milling device, a cutting device, a grinding device, a drilling device, a micromachining device, a part-producing device, and/or the like. In some non-limiting embodiments, industrial machine 104 may include machine controller 104a (e.g., separate from intelligent industrial assistant 102), which may be integrated with (e.g., completely, partially, and/or the like), local to, or remote from industrial machine 104. In some non-limiting embodiments, intelligent industrial assistant 102 may be integrated with (e.g., completely, partially, and/or the like) and/or directly connected to industrial machine 104 and/or machine controller 104a.

User device 105 may include one or more devices capable of receiving information from and/or communicating information to intelligent industrial assistant 102 and/or remote system 106 (e.g., via direct connection, wired and/or wireless network, and/or any other suitable communication technique). For example, user device 105 may include a computing device (e.g., a portable and/or handheld device (e.g., a computer, a laptop, a personal digital assistant (PDA), a smartphone, a tablet, and/or the like), a desktop computer, a server, a group of servers, and/or other like devices). In some non-limiting embodiments, user device 105 may include a development kit, toolkit, and/or the like for developing, modifying, generating, communicating, and/or receiving package data (e.g., dialogue templates and/or the like, as described herein), e.g., for package 102cc. In some non-limiting embodiments, user device 105 may communicate package data to remote system 106, intelligent industrial assistant 102, and/or the like. In some non-limiting embodiments, user device 105 may be integrated with and/or directly connected to interface device 101, intelligent industrial assistant 102, and/or remote system 106.

Remote system 106 may include one or more devices capable of receiving information from and/or communicating information to intelligent industrial assistant 102 and/or user device 105 (e.g., via direct connection, wired and/or wireless network, and/or any other suitable communication technique). For example, remote system 106 may include a computing device (e.g., a portable and/or handheld device (e.g., a computer, a laptop, a personal digital assistant (PDA), a smartphone, a tablet, and/or the like), a desktop computer, a server, a group of servers, and/or other like devices). In some non-limiting embodiments, remote system 106 may receive package data (e.g., dialogue templates and/or the like, as described herein) from user device 105 and/or communicate package data to user device 105. Additionally or alternatively, remote system 106 may communicate package data (e.g., package 102cc and/or the like, as described herein) to intelligent industrial assistant 102c and/or receive package data from intelligent industrial assistant 102c. In some non-limiting embodiments, remote system 106 may be integrated with and/or directly connected to user device 105.

In some non-limiting embodiments, intelligent industrial assistant 102 may be connected to interface device 101, database 103a, external database 103b, industrial machine 104, user device 105, remote system 106, and/or any combination thereof by one or more networks. The network(s) may include one or more wired and/or wireless networks. For example, the network(s) may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, a virtual private network (VPN), a local network, an ad hoc network, an intranet, the Internet, a fiber optic-based network, a cloud computing network, and/or the like, and/or a combination of these or other types of networks. In some non-limiting embodiments, intelligent industrial assistant 102 may capable of (e.g., configured to) communicating (e.g., sending, transmitting, receiving, and/or the like) messages (e.g., email, text (e.g., SMS) messages, multimedia (e.g., MMS) messages), and/or the like over such networks. Additionally or alternatively, intelligent industrial assistant 102 may be capable of (e.g., configured to) accessing media items (e.g., documents and/or the like) available through such networks.

The number and arrangement of systems, devices, and/or networks shown in FIGS. 1A-1E are provided as an example. There may be additional systems, devices, and/or networks; fewer systems, devices, and/or networks; different systems, devices, and/or networks; and/or differently arranged systems, devices, and/or networks than those shown in FIGS. 1A-1E. Furthermore, two or more systems or devices shown in FIGS. 1A-1E may be implemented within a single system or device, or a single system or device shown in FIGS. 1A-1E may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
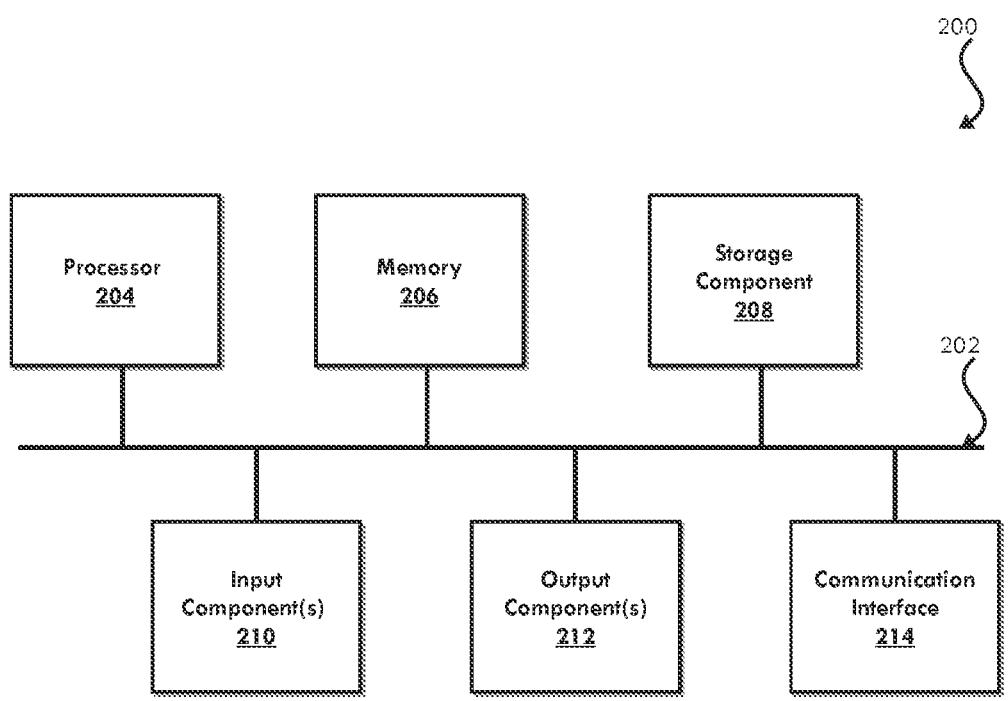
FIG. 2 is a diagram of a non-limiting embodiment of components of one or more devices of FIGS. 1A-1E.

Referring now to FIG. 2, FIG. 2 is a diagram of example components of a device 200. Device 200 may correspond to one or more devices of interface device 101, one or more devices of intelligent industrial assistant 102, one or more devices of database 103a, external database 103b, one or more devices of industrial machine 104, user device 105, and/or one or more devices of remote system 106. In some non-limiting embodiments, interface device 101, intelligent industrial assistant 102, database 103a, external database 103b, industrial machine 104, user device 105, and/or remote system 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
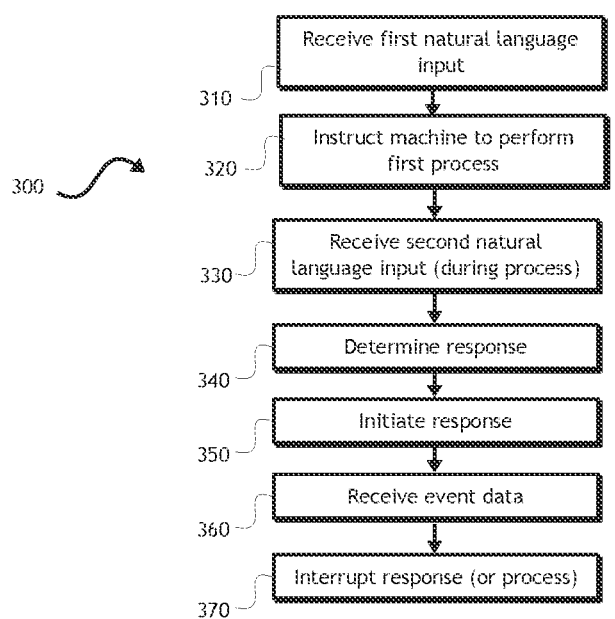
FIG. 3 is a flowchart of a non-limiting embodiment of a process for communication with an intelligent industrial assistant and industrial machine according to the principles of the presently disclosed subject matter.

Referring now to FIG. 3, FIG. 3 is a flowchart of a non-limiting embodiment of a process 300 for communication with an intelligent industrial assistant and industrial machine. In some non-limiting embodiments, one or more of the steps of process 300 may be performed (e.g., completely, partially, and/or the like) by intelligent industrial assistant 102 (e.g., one or more devices of intelligent industrial assistant 102). In some non-limiting embodiments, one or more of the steps of process 300 may be performed (e.g., completely, partially, and/or the like) by another system, another device, another group of systems, or another group of devices, separate from or including intelligent industrial assistant 102, such as user device 101 (e.g., one or more devices of user device 101), database 103a (e.g., one or more devices of database 103a), external database 103b (e.g., one or more devices of external database 103b), and/or industrial machine 104 (e.g., one or more devices of industrial machine 104).

As shown in FIG. 3, at step 310, process 300 may include receiving a first natural language input. For example, intelligent industrial assistant 102 may receive the first natural language input from a user (e.g., via input component 101c or input/output component 101b of interface device 101). In some non-limiting embodiments, the natural langue input may be an audio input (e.g., a voice recording and/or the like), a textual input (e.g., a text message, an email, a chat message, text created by STT/ASR/NLU, HTML, and/or the like), and/or the like.

In some non-limiting embodiments, the first natural language input may be associated with a first command for industrial machine 104 to perform a first process. For example, intelligent industrial assistant 102 may map at least a portion of the natural language input to at least a portion of a dialogue template (e.g., a first dialogue template associated with the first command and/or the like).

In some non-limiting embodiments, the package data (e.g., package 102cc and/or the like) may include a plurality of dialogue templates. Additionally or alternatively, intelligent industrial assistant 102 may select one of the dialogue templates (e.g., the first dialogue template) based on the first natural language input (e.g., based on the portion of the dialogue template mapped to the natural language input, based on the inferred intent of the user, and/or the like). In some non-limiting embodiments, intelligent industrial assistant 102 may determine that at least a portion of the natural language input may be mapped to at least a portion of expected dialogue associated with expected dialogue data of at least one (e.g., a first) dialogue template. For example, intelligent industrial assistant 102 may match at least a portion of the natural language input to at least a portion of expected dialogue associated with expected dialogue data of at least one (e.g., a first) dialogue template. In some non-limiting embodiments, intelligent industrial assistant 102 may map at least a portion of the natural language input to at least one parameter associated with parameter data of at least one (e.g., a first) dialogue template. In some non-limiting embodiments, intelligent industrial assistant 102 may map at least a portion of the natural language input to at least one group associated with group data of at least one (e.g., a first) dialogue template. In some non-limiting embodiments, when the natural language input includes voice/speech that is converted into speech (e.g., speech-to-text, automatic speech recognition, and/or the like, as described herein), a (first) confidence score may be calculated (e.g., for each word, for each group of words (e.g., a phrase), for the input as a whole, and/or the like) based on a probability that text accurately reflects the spoken word(s). Additionally or alternatively, a (second) confidence score may be calculated for the mapping of the natural language input to expected dialogue associated with expected dialogue data of at least one dialogue template (e.g., all dialogue templates of package data 102c, a subset of the dialogue templates (e.g., with at least one word matching the natural language input), and/or the like). Additionally or alternatively, the dialogue templates (e.g., subset of dialogue templates) may be ranked based on the (second) confidence score associated with each dialogue template (e.g., subset of dialogue templates). Additionally or alternatively, a dialogue template associated with a highest (second) confidence score may be selected as the dialogue template to which the natural language input is mapped. Additionally or alternatively, if the confidence score(s) (e.g., second confidence score, combination of first and second confidence scores, and/or the like) is sufficiently high (e.g., above a first threshold), intelligent industrial assistant 102 may proceed with the selected dialogue template. Additionally or alternatively, if the confidence score(s) (e.g., second confidence score, combination of first and second confidence scores, and/or the like) is below the first threshold and above a second threshold (which may be less than the first threshold), intelligent industrial assistant 102 may request confirmation (e.g., communicate a prompt requesting confirmation, as described herein). Additionally or alternatively, if the confidence score(s) (e.g., second confidence score, combination of first and second confidence scores, and/or the like) is below the second threshold, intelligent industrial assistant 102 may reject the input (e.g., communicate a warning indicating that no mapping was determined, communicate a prompt requesting additional natural language input, and/or the like, as described herein).

As shown in FIG. 3, at step 320, process 300 may include instructing the industrial machine to perform the first process. For example, intelligent industrial assistant 102 may instruct industrial machine 104 to perform the first process based on the first natural language input.

In some non-limiting embodiments, intelligent industrial assistant 102 may instruct industrial machine 104 by determining at least one command based on the dialogue template(s) (e.g., first dialogue template) and/or communicating command data associated with the command(s) to the industrial machine 104. In some non-limiting embodiments, intelligent industrial assistant 102 may determine command(s) based on the dialogue template(s) (e.g., first dialogue template) to which natural language input (or a portion thereof) has been mapped. In some non-limiting embodiments, the command(s) may be based on at least one action associated with the dialogue template. In some non-limiting embodiments, intelligent industrial assistant 102 may determine the command(s) based on the action data, parameter data, group data, and/or the like associated with the first dialogue template. For example, the action data may be associated with (e.g., identify, include, and/or the like) at least one command. Additionally or alternatively, the command may include the value of the parameter based on a portion of the natural language input mapped to parameter data of the dialogue template. Additionally or alternatively, the command may be associated with (e.g., identify, be addressed to, and/or the like) a group based on the portion of the natural language input mapped to the group data.

In some non-limiting embodiments, the command data may be associated with at least one executable industrial machine operation (e.g., of the first industrial machine 104). Additionally or alternatively, communicating the command data may include intelligent industrial assistant 102 transmitting the command data via a machine interface (e.g., first industrial machine interface of machine gateway 102e) to the first industrial machine 104 (e.g., a first machine controller 104a thereof).

As shown in FIG. 3, at step 330, process 300 may include receiving a second natural language input. For example, intelligent industrial assistant 102 may receive the second natural language input from the user (e.g., via input component 101c or input/output component 101b of interface device 101). In some non-limiting embodiments or aspect, the second natural language input may be received while the industrial machine is performing the first process.

In some non-limiting embodiments, the second natural language input may be associated with at least one of a query of a database (e.g., database 103a and/or external database 103b) connected to intelligent industrial assistant 102, a query regarding a status of industrial machine 104, a query regarding a status of the (first) process, a request to set up a next (e.g., second) process of industrial machine 104, a request to generate a report associated with industrial machine 104, a request to perform a separate (e.g., third) process by a second industrial machine (e.g., another industrial machine 104), a request to coach the user how to perform a fourth process, or a request to teach the user a new skill.

In some non-limiting embodiments, intelligent industrial assistant 102 may map at least a portion of the second natural language input to at least a portion of a (second) dialogue template, as described herein. For example, the package data (e.g., package 102*cc* and/or the like) may include a plurality of dialogue templates. Additionally or alternatively, intelligent industrial assistant 102 may select a second one of the dialogue templates (e.g., the second dialogue template) based on the second natural language input (e.g., based on the portion of the dialogue template mapped to the natural language input, based on the inferred intent of the user, and/or the like). In some non-limiting embodiments, intelligent industrial assistant 102 may determine that at least a portion of the second natural language input may be mapped to at least a portion of expected dialogue associated with expected dialogue data of the second dialogue template, as described herein. For example, intelligent industrial assistant 102 may match at least a portion of the second natural language input to at least a portion of expected dialogue associated with expected dialogue data of the second dialogue template. In some non-limiting embodiments, intelligent industrial assistant 102 may map at least a portion of the second natural language input to at least one parameter associated with parameter data of the second dialogue template. In some non-limiting embodiments, intelligent industrial assistant 102 may map at least a portion of the second natural language input to at least one group associated with group data of the second dialogue template.

As shown in FIG. 3, at step 340, process 300 may include determining a response. For example, intelligent industrial assistant 102 may determine a (first) response based on the second natural language input.

In some non-limiting embodiments, the (first) response may be based on a context. For example, the context may be based on at least one of the (first) process running on industrial machine 104, one or more processes of a work cell that includes industrial machine 104, a type of industrial machine 104, or a role of the user. In some non-limiting embodiments, a work cell may include an arrangement of resources in a manufacturing environment (e.g., multiple industrial machines 104, at least some of which may have different types) performing processes in series or parallel.

In some non-limiting embodiments, the (first) response may include at least one of coaching the user how to perform a process (e.g., different than the first process, or an upcoming part of the first process) or teaching the user a new skill.

In some non-limiting embodiments, intelligent industrial assistant 102 may determine a response based on determining a second command, communicating the second command, and receiving response data based on the second command. For example, intelligent industrial assistant 102 may determine the second command based on the second dialogue template to which the second natural language input (or a portion thereof) has been mapped, as described herein. In some non-limiting embodiments, the command may be based on at least one action associated with the second dialogue template. Additionally or alternatively, intelligent industrial assistant 102 may communicate command data associated with the second command to at least one of interface device 101, a database (e.g., database 103*a*, external database 103*b*, and/or the like via database interface 102*d*), industrial machine 104 (e.g., machine controller 104*a* via a machine interface), user device 105, remote system 106, and/or the like.

In some non-limiting embodiments, intelligent industrial assistant 102 may receive response data (e.g., from industrial machine 104, database 103*a*, external database 103*b*, and/or the like) in response to the command data. In some non-limiting embodiments, intelligent industrial assistant 102 may receive (first) response data from industrial machine 104. Additionally or alternatively, intelligent industrial assistant 102 may receive (second) response data from a database (e.g., database 103*a* and/or external database 103*b*). In some non-limiting embodiments, intelligent industrial assistant 102 may combine the (first) response data from industrial machine 104 and the (second) response data from the database (e.g., database 103*a* and/or external database 103*b*) to form a single response.

As shown in FIG. 3, at step 350, process 300 may include initiating the response. For example, intelligent industrial assistant 102 may initiate a (first) response. In some non-limiting embodiments, intelligent industrial assistant 102 may initiate communicating the (first) response to the user (e.g., via output component 101*a* or input/output component 101*b* of interface device 101). In some non-limiting embodiments, intelligent industrial assistant 102 may initiate the response (e.g., communication thereof) while industrial machine 104 is performing the first process.

As shown in FIG. 3, at step 360, process 300 may include receiving event data associated with an event. For example, intelligent industrial assistant 102 may receive (first) event data associated with a (first) event, e.g., from industrial machine 104, database 103*a*, and/or external database 103*b*. In some non-limiting embodiments, the event may have a type. For example, the type may be an alarm, an alert, a report, a scheduled event and/or reminder, and/or the like.

In some non-limiting embodiments, the event may be an alarm of industrial machine 104.

As shown in FIG. 3, at step 370, process 300 may include interrupting the response. For example, intelligent industrial assistant 102 may interrupt communication of the (first) response to the user. In some non-limiting embodiments, before interrupting the communication of the response, intelligent industrial assistant 102 may determine whether to interrupt the communication of the first response based on the event data (e.g., based on a type of the event). In some non-limiting embodiments, intelligent industrial assistant 102 may determine whether to interrupt the (first) process being performed by industrial machine 104 based on the event data (e.g., based on a type of the event). Additionally or alternatively, intelligent industrial assistant 102 may instruct industrial machine 104 to interrupt (e.g., stop) the (first) process being performed based on the event data (e.g., an alarm).

In some non-limiting embodiments, intelligent industrial assistant 102 may determine a second response based on the event data. Additionally or alternatively, intelligent industrial assistant 102 may initiate communication of the second response to the user (e.g., via output component 101*a* or input/output component 101*b* of interface device 101). In some non-limiting embodiments, upon completion of the communication of the second response to the user, intelligent industrial assistant 102 may continue communication of the first response to the user (e.g., via output component 101*a* or input/output component 101*b* of interface device 101).

Figure 4:
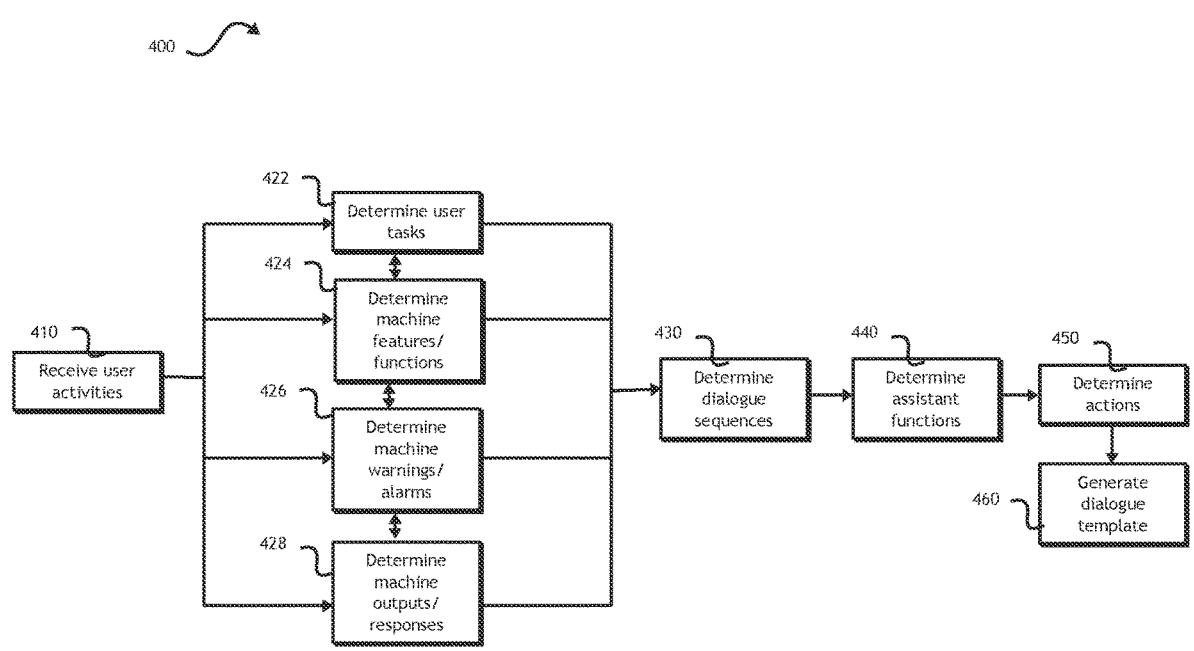
FIG. 4 is a flowchart of a non-limiting embodiment of a process for establishing an ethnographic relationship according to the principles of the presently disclosed subject matter.

Referring now to FIG. 4, FIG. 4 is a flowchart of a non-limiting embodiment of a process 400 for establishing an ethnographic relationship, which may be used with the process 300 shown in FIG. 3. In some non-limiting embodiments, one or more of the steps of process 400 may be performed (e.g., completely, partially, and/or the like) by intelligent industrial assistant 102 (e.g., one or more devices of intelligent industrial assistant 102). In some non-limiting embodiments, one or more of the steps of process 400 may be performed (e.g., completely, partially, and/or the like) by another system, another device, another group of systems, or another group of devices, separate from or including intelligent industrial assistant 102, such as interface device 101 (e.g., one or more devices of interface device 101), database 103a (e.g., one or more devices of database 103a), external database 103b (e.g., one or more devices of external database 103b), industrial machine 104 (e.g., one or more devices of industrial machine 104), user device 105, and/or remote server 106 (e.g., one or more devices of remote server 106).

In some non-limiting embodiments, ethnography may include studying (e.g., observing, receiving activity data regarding, and/or the like) at least one member of a group (e.g., a group of users with a same or similar role). For example, groups of users may include a group of users with roles as machine operators (e.g., of a particular type of machine, a particular model of machine, a set of machines at a particular factory, and/or the like), a group of users with roles as supervisors (e.g., of machine operators, factories, and/or the like), a group of users with roles as manufacturing engineers, a group of users with roles as maintenance personnel, a group of users with roles as salesmen, a group of users with roles as field service engineers, and/or the like. Additionally or alternatively, establishing ethnographic relationships may include generating at least one dialogue template based on at least one activity of at least one member of a group.

As shown in FIG. 4, at step 410, process 400 may include receiving user activity data associated with at least one user activity. For example, intelligent industrial assistant 102 (and/or another device separate from or including intelligent industrial assistant 102, such as interface device 101, database 103a, external database 103b, industrial machine 104, user device 105, and/or remote server 106) may receive user activity data from a user (e.g., operator of an industrial machine and/or the like), from an observer of such a user, and/or the like. In some non-limiting embodiments, the activity data may include at least one activity (e.g., task; action; report; any combination thereof; any sequence, group, flow, and/or the like thereof; and/or the like). In some non-limiting embodiments, the activity (or activities) of the user may be specific to the role of such user (e.g., machine operator and/or the like).

As shown in FIG. 4, at step 422, process 400 may include determining user tasks based on the user activity data. For example, intelligent industrial assistant 102 (and/or another device separate from or including intelligent industrial assistant 102, such as interface device 101, database 103a, external database 103b, industrial machine 104, user device 105, and/or remote server 106) may determine user tasks based on the activity data. For example, intelligent industrial assistant 102 may parse the activity data to identify individual tasks.

As shown in FIG. 4, at step 424, process 400 may include determining machine features based on the user tasks. For example, intelligent industrial assistant 102 (and/or another device separate from or including intelligent industrial assistant 102, such as interface device 101, database 103a, external database 103b, industrial machine 104, user device 105, and/or remote server 106) may determine machine features (e.g., functions, commands, variables, fields, inputs, outputs, any combination thereof, and/or the like) based on the user tasks. In some non-limiting embodiments, intelligent industrial assistant 102 may determine the machine features based on a predetermined mapping between at least one user task and at least one machine feature. Additionally or alternatively, intelligent industrial assistant 102 may receive input from a user (e.g., machine operator), an observer of the user, and/or the like associating at least one user task with at least one machine feature.

As shown in FIG. 4, at step 426, process 400 may include determining possible machine warnings based on the user tasks and/or the machine features. For example, intelligent industrial assistant 102 (and/or another device separate from or including intelligent industrial assistant 102, such as interface device 101, database 103a, external database 103b, industrial machine 104, user device 105, and/or remote server 106) may determine possible machine warnings (e.g., alarms, alerts, and/or the like) based on the user tasks and/or the machine features. In some non-limiting embodiments, intelligent industrial assistant 102 may determine possible machine warnings based on a predetermined mapping between at least one machine warning and at least one machine feature. Additionally or alternatively, intelligent industrial assistant 102 may receive input from a user (e.g., machine operator), an observer of the user, and/or the like associating at least one possible machine warning with at least one machine feature.

As shown in FIG. 4, at step 428, process 400 may include determining possible machine responses. For example, intelligent industrial assistant 102 (and/or another device separate from or including intelligent industrial assistant 102, such as interface device 101, database 103a, external database 103b, industrial machine 104, user device 105, and/or remote server 106) may determine possible machine responses (e.g., outputs, response messages, reports, warnings, and/or the like) based on at least one of the user tasks, the machine features, the possible machine warnings, any combination thereof, and/or the like. In some non-limiting embodiments, intelligent industrial assistant 102 may determine possible machine responses based on a predetermined mapping between at least one possible machine responses and at least one machine feature. Additionally or alternatively, intelligent industrial assistant 102 may receive input from a user (e.g., machine operator), an observer of the user, and/or the like associating at least one possible machine response with at least one machine feature.

As shown in FIG. 4, at step 430, process 400 may include determining a dialogue sequence. For example, intelligent industrial assistant 102 (and/or another device separate from or including intelligent industrial assistant 102, such as interface device 101, database 103a, external database 103b, industrial machine 104, user device 105, and/or remote server 106) may determine at least one dialogue sequence based on at least one of the user tasks, the machine features, the possible machine warnings, the possible machine responses, any combination thereof, and/or the like. In some non-limiting embodiments, intelligent industrial assistant 102 may determine the dialogue sequence(s) based on a predetermined mapping between at least one dialogue sequence and at least one of the user tasks, the machine features, the possible machine warnings, the possible machine responses, any combination thereof, and/or the like. Additionally or alternatively, intelligent industrial assistant 102 may receive input from a user (e.g., machine operator), an observer of the user, and/or the like associating at least one dialogue sequence with at least one of the user tasks, the machine features, the possible machine warnings, the possible machine responses, any combination thereof, and/or the like.

As shown in FIG. 4, at step 440, process 400 may include determining applicable functions of intelligent industrial assistant 102. For example, intelligent industrial assistant 102 (and/or another device separate from or including intelligent industrial assistant 102, such as interface device 101, database 103a, external database 103b, industrial machine 104, user device 105, and/or remote server 106) may determine at least one applicable function of intelligent industrial assistant 102 based on at least one of the user tasks, the machine features, the possible machine warnings, the possible machine responses, the dialogue sequences, any combination thereof, and/or the like. In some non-limiting embodiments, intelligent industrial assistant 102 may determine the applicable function(s) of intelligent industrial assistant 102 based on a predetermined mapping between at least one function of industrial assistant 102 and at least one of the user tasks, the machine features, the possible machine warnings, the possible machine responses, the dialogue sequences, any combination thereof, and/or the like. Additionally or alternatively, intelligent industrial assistant 102 may receive input from a user (e.g., machine operator), an observer of the user, and/or the like associating at least one function of industrial assistant 102 with at least one of the user tasks, the machine features, the possible machine warnings, the possible machine responses, the dialogue sequences, any combination thereof, and/or the like.

As shown in FIG. 4, at step 450, process 400 may include determining actions. For example, intelligent industrial assistant 102 (and/or another device separate from or including intelligent industrial assistant 102, such as interface device 101, database 103a, external database 103b, industrial machine 104, user device 105, and/or remote server 106) may determine at least one action based on at least one of the applicable functions of intelligent industrial assistant 102, the user tasks, the machine features, the possible machine warnings, the possible machine responses, the dialogue sequences, any combination thereof, and/or the like. In some non-limiting embodiments, intelligent industrial assistant 102 may determine the actions(s) based on a predetermined mapping between at least one action and at least one applicable functions of intelligent industrial assistant 102. Additionally or alternatively, intelligent industrial assistant 102 may receive input from a user (e.g., machine operator), an observer of the user, and/or the like associating at least one action with at least one of the applicable functions of industrial assistant 102, the user tasks, the machine features, the possible machine warnings, the possible machine responses, the dialogue sequences, any combination thereof, and/or the like.

As shown in FIG. 4, at step 460, process 400 may include generating at least one dialogue template. For example, intelligent industrial assistant 102 (and/or another device separate from or including intelligent industrial assistant 102, such as interface device 101, database 103a, external database 103b, industrial machine 104, user device 105, and/or remote server 106) may generate a dialogue template based on at least one of the applicable functions of intelligent industrial assistant 102, the user tasks, the machine features, the possible machine warnings, the possible machine responses, the dialogue sequences, the actions, any combination thereof, and/or the like. For example, a dialogue template may include at least one of function data, group data, feature data, sequence data, parameter data, expected dialogue data, action data, any combination thereof, and/or the like, each of which may be determined at least in part based on at least one of the applicable functions of intelligent industrial assistant 102, the user tasks, the machine features, the possible machine warnings, the possible machine responses, the dialogue sequences, the actions, any combination thereof, and/or the like. In some non-limiting embodiments, the dialogue template may be generated based on a predetermined mapping between at least a portion of at least one of the applicable functions of intelligent industrial assistant 102, the user tasks, the machine features, the possible machine warnings, the possible machine responses, the dialogue sequences, the actions, any combination thereof, and/or the like and at least one of function data, group data, feature data, sequence data, parameter data, expected dialogue data, action data, any combination thereof, and/or the like. Additionally or alternatively, input may be received from a user (e.g., machine operator), an observer of the user, and/or the like associating at least a portion of at least one of the applicable functions of intelligent industrial assistant 102, the user tasks, the machine features, the possible machine warnings, the possible machine responses, the dialogue sequences, the actions, any combination thereof, and/or the like with at least one of function data, group data, feature data, sequence data, parameter data, expected dialogue data, action data, any combination thereof, and/or the like.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for communication with an intelligent industrial assistant and industrial machine, comprising:
receiving, by an intelligent industrial assistant, a first natural language input from a user, the first natural language input associated with a first command for an industrial machine to perform a first process;
mapping, by the intelligent industrial assistant, at least a portion of the first natural language input to at least a portion of a first dialogue template of a plurality of dialogue templates that is associated with the first command, wherein mapping the at least the portion of the first natural language input to the at least the portion of the first dialogue template comprises generating a first confidence score and a second confidence score for controlling selection of the first dialogue template of the plurality of dialogue templates based on comparing the first confidence score and the second confidence score to a plurality of thresholds;
instructing, by the intelligent industrial assistant, the industrial machine to perform the first process based on the first natural language input by determining the first command based on the first dialogue template and communicating command data associated with the first command to the industrial machine, wherein determining the first command comprises controlling selection of a first action associated with the first command from a plurality of actions based on at least one first prerequisite criterion;

receiving, by the intelligent industrial assistant, a second natural language input from the user while the industrial machine is performing the first process;

mapping, by the intelligent industrial assistant, at least a portion of the second natural language input to at least a portion of a second dialogue template of the plurality of dialogue templates;

determining, by the intelligent industrial assistant, a first response based on the second natural language input, wherein determining the first response is based on determining a second command based on the second dialogue template, communicating the second command, and receiving response data based on the second command, wherein determining the second command comprises controlling selection of a second action associated with the second command from the plurality of actions based on at least one second prerequisite criterion; and initiating, by the intelligent industrial assistant, communication of the first response to the user while the industrial machine is performing the first process.

2. The method of claim 1, wherein the first response is based on a first context, and wherein the first context is based on at least one of the first process running on the industrial machine, one or more processes of a work cell that includes the industrial machine, a type of the industrial machine, or a role of the user.

3. The method of claim 1, further comprising:
receiving, by the intelligent industrial assistant, event data associated with a first event from the industrial machine; and
interrupting, by the intelligent industrial assistant, the communication of the response to the user.

4. The method of claim 3, further comprising, before interrupting the communication of the response, determining, by the intelligent industrial assistant, whether to interrupt the communication of the first response based on the event data.

5. The method of claim 3, further comprising:
determining, by the intelligent industrial assistant, a second response based on the event data; and
initiating, by the intelligent industrial assistant, communication of the second response to the user.

6. The method of claim 5, further comprising:
upon completion of the communication of the second response to the user, continuing, by the intelligent industrial assistant, communication of the first response to the user.

7. The method of claim 1, wherein the second natural language input is associated with at least one of a query of a database connected to the intelligent industrial assistant, a query regarding a status of the industrial machine, a query regarding a status of the first process, a request to set up a second process of the industrial machine, a request to generate a report associated with the industrial machine, a request to perform a third process by a second industrial machine, a request to coach the user how to perform a fourth process, or a request to teach the user a new skill.

8. The method of claim 1, wherein the first response comprises at least one of coaching the user how to perform a second process or teaching the user a new skill.

9. The method of claim 3, wherein the first event comprises an alarm of the industrial machine.

10. The method of claim 9, further comprising:
instructing, by the intelligent industrial assistant, the industrial machine to stop the first process based on the alarm.

11. The method of claim 1, wherein the first natural language input comprises a first voice input, wherein the first confidence score is associated with a first probability that a first text representation accurately reflects the first voice input, and wherein the second confidence score is associated with mapping the first text representation to the first dialogue template.

12. A system for communication with an intelligent industrial assistant and industrial machine, comprising:
at least one processor; and
at least one non-transitory computer-readable medium comprising instructions to direct the at least one processor to:
receive, via an intelligent industrial assistant, a first natural language input from a user, the first natural language input associated with a first command for an industrial machine to perform a first process;
map, via the intelligent industrial assistant, at least a portion of the first natural language input to at least a portion of a first dialogue template of a plurality of dialogue templates that is associated with the first command, wherein mapping the at least the portion of the first natural language input to the at least the portion of the first dialogue template comprises generating a first confidence score and a second confidence score for controlling selection of the first dialogue template of the plurality of dialogue templates based on comparing the first confidence score and the second confidence score to a plurality of thresholds;
instruct, via the intelligent industrial assistant, the industrial machine to perform the first process based on the first natural language input by determining the first command based on the first dialogue template and communicating command data associated with the first command to the industrial machine, wherein determining the first command comprises controlling selection of a first action associated with the first command from a plurality of actions based on at least one first prerequisite criterion;
receive, via the intelligent industrial assistant, a second natural language input from the user while the industrial machine is performing the first process;
map, via the intelligent industrial assistant, at least a portion of the second natural language input to at least a portion of a second dialogue template of the plurality of dialogue templates;
determine, via the intelligent industrial assistant, a first response based on the second natural language input, wherein determining the first response is based on determining a second command based on the second dialogue template, communicating the second command, and receiving response data based on the second command, wherein determining the second command comprises controlling selection of a second action associated with the second command from the plurality of actions based on at least one second prerequisite criterion; and
initiate, via the intelligent industrial assistant, communication of the first response to the user while the industrial machine is performing the first process.

13. The system of claim 12, wherein the instructions further direct the at least one processor to:
- receive, by the intelligent industrial assistant, event data associated with a first event from the industrial machine; and
- interrupt, by the intelligent industrial assistant, the communication of the response to the user.

14. The system of claim 13, wherein the instructions further direct the at least one processor to, before interrupting the communication of the response, determine, by the intelligent industrial assistant, whether to interrupt the communication of the first response based on the event data.

15. The system of claim 13, wherein the instructions further direct the at least one processor to:
- determine, by the intelligent industrial assistant, a second response based on the event data; and
- initiate, by the intelligent industrial assistant, communication of the second response to the user.

16. The system of claim 15, wherein the instructions further direct the at least one processor to:
- upon completion of the communication of the second response to the user, continue, by the intelligent industrial assistant, communication of the first response to the user.

17. The system of claim 13, wherein the first event comprises an alarm of the industrial machine, wherein the instructions further direct the at least one processor to:
- instruct, by the intelligent industrial assistant, the industrial machine to stop the first process based on the alarm.

18. The system of claim 12, wherein the first natural language input comprises a first voice input, wherein the first confidence score is associated with a first probability that a first text representation accurately reflects the first voice input, and wherein the second confidence score is associated with mapping the first text representation to the first dialogue template.

19. A computer program product for communication with an intelligent industrial assistant and industrial machine, the computer program product comprising at least one non-transitory computer-readable medium including one or more instructions that, when executed by at least one processor, cause the at least one processor to:
- receive, via an intelligent industrial assistant, a first natural language input from a user, the first natural language input associated with a first command for an industrial machine to perform a first process;
- map, via the intelligent industrial assistant, at least a portion of the first natural language input to at least a portion of a first dialogue template of a plurality of dialogue templates that is associated with the first command, wherein mapping the at least the portion of the first natural language input to the at least the portion of the first dialogue template comprises generating a first confidence score and a second confidence score for controlling selection of the first dialogue template of the plurality of dialogue templates based on comparing the first confidence score and the second confidence score to a plurality of thresholds;
- instruct, via the intelligent industrial assistant, the industrial machine to perform the first process based on the first natural language input by determining the first command based on the first dialogue template and communicating command data associated with the first command to the industrial machine, wherein determining the first command comprises controlling selection of a first action associated with the first command from a plurality of actions based on at least one first prerequisite criterion;
- receive, via the intelligent industrial assistant, a second natural language input from the user while the industrial machine is performing the first process;
- map, via the intelligent industrial assistant, at least a portion of the second natural language input to at least a portion of a second dialogue template of the plurality of dialogue templates;
- determine, via the intelligent industrial assistant, a first response based on the second natural language input, wherein determining the first response is based on determining a second command based on the second dialogue template, communicating the second command, and receiving response data based on the second command, wherein determining the second command comprises controlling selection of a second action associated with the second command from the plurality of actions based on at least one second prerequisite criterion; and
- initiate, via the intelligent industrial assistant, communication of the first response to the user while the industrial machine is performing the first process.

20. The computer program product of claim 19, wherein the first natural language input comprises a first voice input, wherein the first confidence score is associated with a first probability that a first text representation accurately reflects the first voice input, and wherein the second confidence score is associated with mapping the first text representation to the first dialogue template.

* * * * *